(12) United States Patent
Cao et al.

(10) Patent No.: US 12,130,403 B2
(45) Date of Patent: Oct. 29, 2024

(54) APPARENT RESISTIVITY-DEPTH SECTION GENERATING METHOD FOR SHORT-OFFSET ELECTROMAGNETIC EXPLORATION

(71) Applicant: Jiangsu University, Jiangsu (CN)

(72) Inventors: Qinghua Cao, Jiangsu (CN); Shu Yan, Jiangsu (CN); Guoqiang Xue, Jiangsu (CN); Weiying Chen, Jiangsu (CN); Xin Wu, Jiangsu (CN); Weizhong Qiu, Jiangsu (CN)

(73) Assignee: Jiangsu University, Jiangsu (CN)

( * ) Notice: Subject to any disclaimer, the term of this patent is extended or adjusted under 35 U.S.C. 154(b) by 0 days.

(21) Appl. No.: 18/013,554

(22) PCT Filed: Oct. 21, 2021

(86) PCT No.: PCT/CN2021/125128
§ 371 (c)(1),
(2) Date: Dec. 29, 2022

(87) PCT Pub. No.: WO2023/050496
PCT Pub. Date: Apr. 6, 2023

(65) Prior Publication Data
US 2023/0341579 A1    Oct. 26, 2023

(30) Foreign Application Priority Data
Sep. 29, 2021 (CN) .......................... 202111147897.7

(51) Int. Cl.
*G01V 3/12* (2006.01)
*G01V 3/28* (2006.01)

(52) U.S. Cl.
CPC . *G01V 3/12* (2013.01); *G01V 3/28* (2013.01)

(58) Field of Classification Search
CPC .............. G01V 3/02; G01V 3/12; G01V 3/28
See application file for complete search history.

(56) References Cited

U.S. PATENT DOCUMENTS

| 2008/0040042 A1 | 2/2008 | Page |
| 2010/0332198 A1* | 12/2010 | Wahrmund ............ G01V 3/083 703/2 |
| 2021/0055083 A1* | 2/2021 | Zheng .................. F41H 11/136 |

FOREIGN PATENT DOCUMENTS

| AU | 2020101824 A4 * | 9/2020 |
| CN | 101261327 | 9/2008 |

(Continued)

OTHER PUBLICATIONS

Understanding of Grounded-Wire TEM Sounding with Near-Source Configuration (Year: 2013).*

(Continued)

*Primary Examiner* — Mohamed Charioui
*Assistant Examiner* — Dacthang P Ngo
(74) *Attorney, Agent, or Firm* — JCIPRNET

(57) ABSTRACT

The present disclosure provides an apparent resistivity-depth section generating method for short-offset electromagnetic exploration, including: determining, in field zones divided quantitatively based on the induction number, positions of a recording point for each of observation points and frequencies or a time window thereof, and taking determined positions of the recording point as the assignment point for the observation point and the frequencies or the time window thereof, where one survey line of an axial configuration generates one apparent resistivity-depth section along the survey line; and one survey line of an equatorial configuration typically generates one apparent resistivity-depth section along the survey line, and apparent resistivity-depth sections along connecting lines from the observation points to the source which are the same as observation points in the number.

7 Claims, 11 Drawing Sheets

(56) References Cited

FOREIGN PATENT DOCUMENTS

| CN | 102053281 | 5/2011 |
|----|-----------|--------|
| CN | 102419452 | 4/2012 |
| CN | 103064124 | 4/2013 |
| CN | 105676299 | 6/2016 |
| CN | 105700026 | 6/2016 |
| CN | 106772630 | 5/2017 |
| CN | 107015286 | 8/2017 |
| CN | 109541695 | 3/2019 |

OTHER PUBLICATIONS

Di, Development of the emerging electromagnetic methods for deep earth exploration (Year: 2018).*
Haldar, Electromagnetic Survey (Year: 2017).*
Kaufman A.A. et al., "Frequency and Transient Soundings" Elsevier, 1983, pp. 93-94.
N. B. Boschetto et al., "Controlled-source audiofrequency magnetotelluric responses of three-dimensional bodies", Geophysics, Feb. 1991; pp. 255-264.
Xue Guoqiang et al., "Research study on the short offset time-domain electromagnetic method for deep exploration", Journal of Applied Geophysics, Jun. 2018, pp. 131-137.
"International Search Report (Form PCT/ISA/210) of PCT/CN2021/125128," mailed on Jun. 23, 2022, pp. 1-5.
"Written Opinion of the International Searching Authority (Form PCT/ISA/237) of PCT/CN2021/125128," mailed on Jun. 23, 2022, pp. 1-4.

* cited by examiner

APPARENT RESISTIVITY-DEPTH SECTION GENERATING METHOD FOR SHORT-OFFSET ELECTROMAGNETIC EXPLORATION

CROSS-REFERENCE TO RELATED APPLICATION

This application is a 371 of international application of PCT application serial no. PCT/CN2021/125128, filed on Oct. 21, 2021, which claims the priority benefits of China application no. 202111147897.7, filed on Sep. 29, 2021. The entirety of each of the above mentioned patent applications is hereby incorporated by reference herein and made a part of this specification.

TECHNICAL FIELD

The present disclosure belongs to the field of electromagnetic exploration, and in particular relates to a data interpretation method for short-offset electromagnetic exploration.

BACKGROUND

In active-source electromagnetic exploration, because of the limitation of transmitter power the field zone of CSAMT (controlled source audio-frequency magneto-telluric) will inevitably enter from the far-field zone to the intermediate-field zone or even the near-field zone as the frequency decreases. The original long-offset exploration is converted into to short-offset exploration with the decrease of the induction number (Kaufman A A, Keller G V. *Frequency and Transient Soundings*. Elsevier—Amsterdam—Oxford—New York 1983: p 93-94.). Correspondingly, the recording point will move towards the source under the action of the nonplanarwave effects with the increase of nonplanarwave-to-planarwave ratio, and the shadow effect will occur typically in case of complex geoelectric structure in the survey area (Boschetto N B, Hohmann G W. Controlled-source Audiofrequency Magnetotelluric Responses of Three-dimensional Bodies. *Geophysics*, 1991, 56(2): 255-264.). Due to the existence of short-offset exploration, a new apparent resistivity-depth section generating method is required to adapt to the movement of the recording point.

SUMMARY

In view of shortages in the prior art, the present disclosure provides a method of generating apparent resistivity-depth section with observed data for short-offset electromagnetic exploration, with the aim of conveniently solving a shadow effect caused by nonplanarwaves in short-offset exploration.

The present disclosure adopts the following technical solutions.

A method of generating apparent resistivity-depth section with observation data for short-offset electromagnetic exploration includes:

dividing a field zone according to an induction number (a ratio of an offset to a detection depth), and determining positions of a recording point for each of observation points in a near-field zone, an intermediate-field zone and a far-field zone, specifically:

dividing the field zone according to the ratio of the offset $R_i$ to the detection depth $H_{i,j}$ determining the field zone as the near-field zone if $$0 \le \frac{R_i}{H_{i,j}} \le 1 \tag{1a}$$

as the intermediate-field zone if $$1 < \frac{R_i}{H_{i,j}} < 10 \tag{1b}$$

as the far-field zone if $$\frac{R_i}{H_{i,j}} \ge 10 \tag{1c}$$

where, i=1, 2, . . . , m is a serial number of the observation point, and j=1,2, . . . , n is a serial number of frequencies; and determining the positions of the recording point for each of the observation points according to the divided zones above: a horizontal position of the recording point: the horizontal position of the recording point in the near-field zone is a midpoint of the offset, that in the far-field zone is a position where the observation point is located, and that in the intermediate-field zone moves linearly from the midpoint of the offset to the position where the observation point is located, as the induction number increases; and a vertical position of the recording point: the vertical position of the recording point in the near-field zone and the intermediate-field zone is located at the intersection of a line from the detection depth to a source and a perpendicular line passing through the horizontal position of the recording point, and that in the far-field zone is equal to the detection depth; and taking the positions of the recording point as an assignment point for an apparent resistivity corresponding to each observation point and the frequencies thereof, where (1) for an axial configuration, assuming that the source coincides with an origin O of a rectangular coordinate system, and a survey line is arranged along an x-axis, then on the xOz plane the horizontal position $P_{i,j}^x$ of the recording point for each observation point in the near-field zone is $$P_{i,j}^x = \frac{R_i}{2},$$

that in the far-field zone is $P_{i,j}^x = R_i$; and that in the intermediate-field zone moves linearly from $$P_{i,j}^x = \frac{R_i}{2}$$

to observation point, specifically:

$$P_{i,j}^x = \begin{cases} \frac{R_i}{2}, & 0 \leq \frac{R_i}{H_{i,j}} \leq 1 \\ \frac{R_i}{18}\left(\frac{R_i}{H_{i,j}} - 1\right) + \frac{R_i}{2}, & 1 < \frac{R_i}{H_{i,j}} < 10 \\ R_i, & \frac{R_i}{H_{i,j}} \geq 10 \end{cases} \quad (2a)$$

the vertical position $P_{i,j}^z$ of the recording point for each observation point in the near-field zone and the intermediate-field zone is at the intersection of the line from the $H_{i,j}$ to the source and the perpendicular line passing through the $P_{i,j}^x$ and that in the far-field zone is $-H_{i,j}$, specifically:

$$P_{i,j}^z = \begin{cases} -\frac{H_{i,j}}{R_i} P_{i,j}^x = -\frac{H_{i,j}}{2}, & 0 \leq \frac{R_i}{H_j} \leq 1 \\ -\frac{H_{i,j}}{R_i} P_{i,j}^x = -\frac{R_i + 8H_{i,j}}{18}, & 1 < \frac{R_i}{H_{i,j}} < 10 \\ -H_{i,j}, & \frac{R_i}{H_{i,j}} \geq 10 \end{cases} \quad (2b)$$

the above positions of the recording point are an assignment point for an apparent resistivity $\rho_{i,j}^a$ of each observation point of the axial configuration on the xOz plane; and one survey line of the axial configuration generates one apparent resistivity-depth section along the survey line; and (2) for an equatorial configuration, assuming that the survey line is arranged along an x'-axis of a rectangular coordinate system, a midpoint of the survey line is taken as an origin O', the source coincides with an origin O of a cylindrical-coordinate system, the line from the source to the observation point is along an r-axis, a part $$\frac{R_i}{H_{i,j}} \geq 10$$

in Equation (2) for the recording point of the axial configuration is taken, and the offset R is replaced with a position $x_i'$ of the observation point on the x'-axis, then on the x'O'z plane the horizontal position and the vertical position P of the recording point for each observation point are:

$$P_{i,j}^{x'} = x_i', \text{ if } \frac{R_i}{H_{i,j}} \geq 10 \quad (3a)$$

$$P_{i,j}^z = -H_{i,j}, \text{ if } \frac{R_i}{H_{i,j}} \geq 10 \quad (3b)$$

a relationship between the offset $R_i$ and the position $x_i'$ of the observation point is expressed as:

$$R_i = \sqrt{OO'^2 + x_i'^2} \quad (4)$$

the above positions of the recording point are the assignment point for the apparent resistivity $\rho_{i,j}^a$ of each observation point of the equatorial configuration on the x'O'z plane;

if a superscript x in Equation (2) for the recording point of the axial configuration is replaced as r, then on the rOz plane the horizontal position $\rho_{i,j}^r$ and the vertical position $P_{i,j}^z$ of the recording point for each observation point of the equatorial configuration are:

$$P_{i,j}^r = \begin{cases} \frac{R_i}{2}, & 0 \leq \frac{R_i}{H_{i,j}} \leq 1 \\ \frac{R_i}{18}\left(\frac{R_i}{H_{i,j}} - 1\right) + \frac{R_i}{2}, & 1 < \frac{R_i}{H_{i,j}} < 10 \\ R_i, & \frac{R_i}{H_{i,j}} \geq 10 \end{cases} \quad (5a)$$

$$P_{i,j}^z = \begin{cases} -\frac{H_{i,j}}{R_i} P_{i,j}^r = -\frac{H_{i,j}}{2}, & 0 \leq \frac{R_i}{H_j} \leq 1 \\ -\frac{H_{i,j}}{R_i} P_{i,j}^r = -\frac{R_i + 8H_{i,j}}{18}, & 1 < \frac{R_i}{H_{i,j}} < 10 \\ -H_{i,j}, & \frac{R_i}{H_{i,j}} \geq 10 \end{cases} \quad (5b)$$

the above positions of the recording point are the assignment point for the apparent resistivity $\rho_{i,j}^a$ of each observation point of the equatorial configuration on the rOz plane; and typically, one survey line of the equatorial configuration including m observation points generates one apparent resistivity-depth section along the survey line and m apparent resistivity-depth sections along connecting lines from the observation points to the source.

The detection depth in the equations above may be calculated by the following general equations, or by other detection depth equations:

$$H_{i,j} \approx 503 \sqrt{\frac{\rho_{i,j}^a}{f_{i,j}}} m \quad (6)$$

(6)

where $f_{i,j}$ is the jth frequency of the observation point i and $\rho_{i,j}^a$ is the apparent resistivity.

Further, the above apparent resistivity $\rho_{i,j}^a$ is obtained from any definition or algorithm, such as Cagniard apparent resistivity and a single-component apparent resistivity, or any future improved apparent resistivity definition and algorithm.

Further, the above method is applicable to any configuration with the offset, regardless of an electric source or a magnetic source.

Further, field observation records further include the position of the source besides the positions of the observation point, so as to determine the offset.

Further, the field zone division standard can be adjusted for any configuration, source and observation component.

1) The present disclosure provides a simple method of separating responses of planarwaves and nonplanarwaves for short-offset electromagnetic exploration, solving the shadow effect and expanding the application scope of the apparent resistivity-depth section interpretation method.

2) When the observation point cannot be arranged at a construction site limited by terrain, surface features and the like, the geoelectric responses below the original observation point can be observed at a different place by selecting appropriate offset or/and frequency, and thus the shadow effect is used.

3) Since the present disclosure can represent the geoelectric structure beyond that directly beneath the observation point, the equatorial configuration can be used to form a multiple apparent resistivity-depth sections to achieve quasi-three-dimensional (3D) exploration.

In the figures: 1. source, 2. observation point, 3. offset, 4. detection depth $H_{i,j}$, 5. recording point $(P_{i,j}^x, P_{i,j}^z)$, $(P_{i,j}^{x'}, P_{i,j}^{z})$ or $(P_{i,j}^r, P_{i,j}^z)$, 6. distance, and 7. apparent resistivity contour curve.

DETAILED DESCRIPTION OF THE EMBODIMENTS

To clarify the purpose, technical solutions and advantages of the present disclosure, the present disclosure is further described below in conjunction with the drawings and examples. It should be understood that the examples described herein are only used to explain the present disclosure, not to limit the present disclosure.

The present disclosure provides a method for generating apparent resistivity-depth section from observed data in short-offset electromagnetic exploration. A field zone is divided according to an induction number (a ratio of an offset to a detection depth), specifically:

The field zone is divided according to the ratio of the offset R to the detection depth $H_{i,j}$, and it is determined as the near-field zone if $$0 \le \frac{R_i}{H_{i,j}} \le 1 \tag{1a}$$

as the intermediate-field zone if $$1 < \frac{R_i}{H_{i,j}} < 10 \tag{1b}$$

as the far-field zone if $$\frac{R_i}{H_{i,j}} \ge 10 \tag{1c}$$

Positions of a recording point for each of observation points are determined from this. In the foregoing equations, 1, 2, ..., m is a serial number of the observation point, and j=1, 2, ..., n is a serial number of the frequencies.

According to the above divided field zones, the positions of the recording point for the observation point are determined in the near-field zone, the intermediate-field zone and the far-field zone, and the positions of the recording point are taken as the assignment point for the apparent resistivity corresponding to each observation point and the frequencies thereof.

Figure 1:
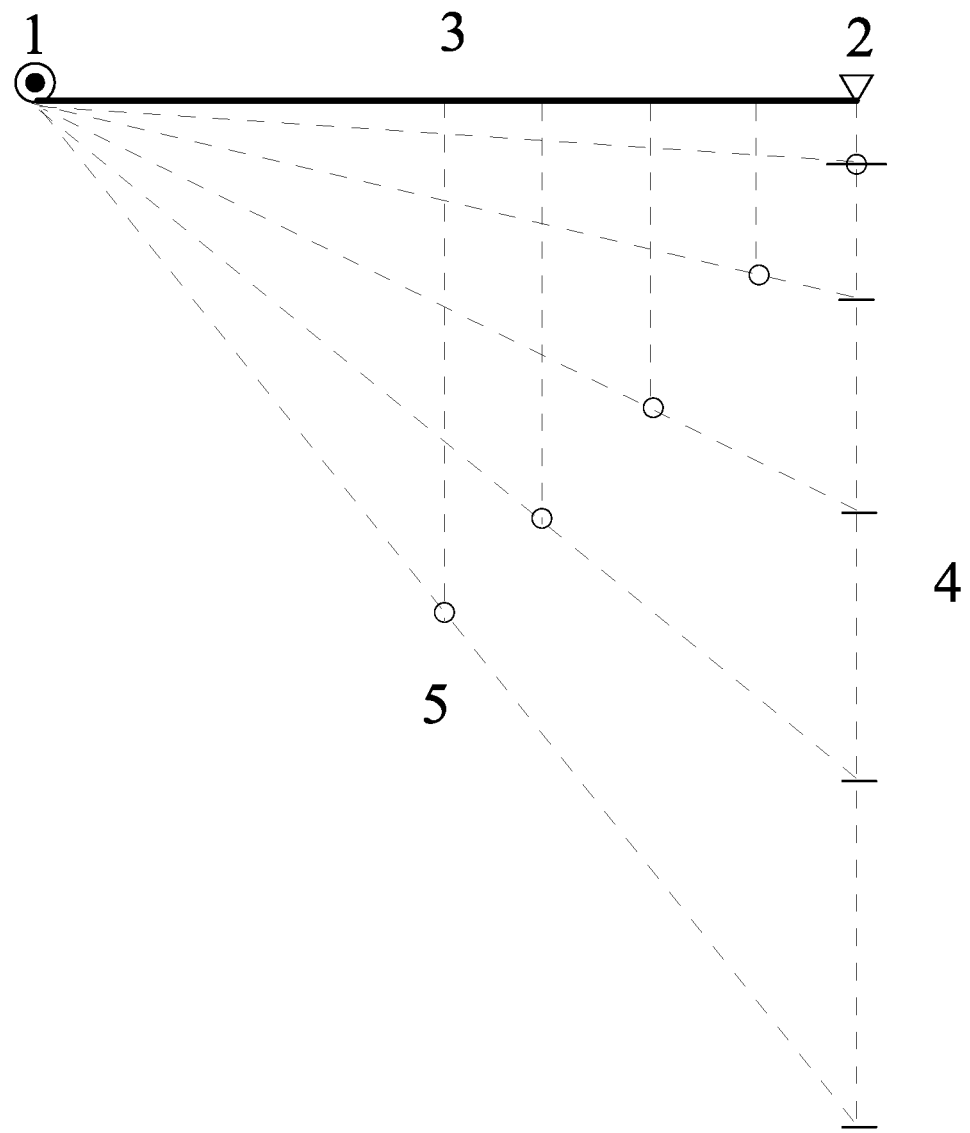
FIG. 1 illustrates the offset, detection depth and observation point.

As shown in FIG. 1, the horizontal position of the recording point in the near-field zone is the midpoint of the offset, that in the far-field zone is the position where the observation point is located, and that in the intermediate-field zone moves linearly from the midpoint of the offset to the position where the observation point is located. The vertical position of the recording point in the near-field zone and the intermediate-field zone is located at the point of intersection between the connecting line from the detection depth to the source and the perpendicular line passing through the horizontal position of the recording point, and that in the far-field zone is equal to the detection depth.

Figure 2A:
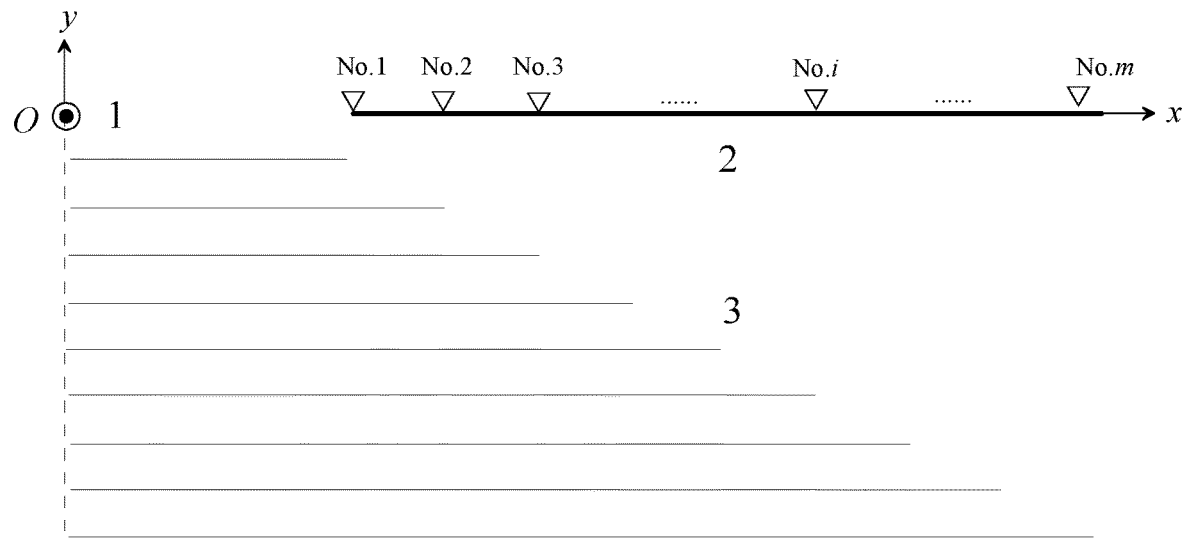
FIG. 2A is the arranged plan of the axial configuration and apparent resistivity-depth section.

With an axial configuration and an equatorial configuration as examples, the apparent resistivity-depth section is specifically generated as follows:

(1) The axial configuration is as shown in FIG. 2A. Assuming that the source coincides with the origin O of a rectangular coordinate system, and the survey line is arranged along the x-axis, on the xOz plane the horizontal position $P_{i,j}^x$ of the recording point for each observation point in the near-field zone is $$P_{i,j}^x = \frac{R_i}{2},$$

and that in the far-field zone is $P_{i,j}^x = R_i$; and in the intermediate-field zone, the horizontal position of the recording point moves linearly from $$P_{i,j}^x = \frac{R_i}{2},$$

to the observation point.

$$P_{i,j}^x = \begin{cases} \dfrac{R_i}{2}, & 0 \le \dfrac{R_i}{H_{i,j}} \le 1 \\ \dfrac{R_i}{18}\left(\dfrac{R_i}{H_{i,j}} - 1\right) + \dfrac{R_i}{2}, & 1 < \dfrac{R_i}{H_{i,j}} < 10 \\ R_i, & \dfrac{R_i}{H_{i,j}} \ge 10 \end{cases} \tag{2a}$$

The vertical position $P_{i,j}^z$ of the recording point for each observation point in the near-field zone and the intermediate-field zone is located at the intersection of the line from $H_{i,j}$ to the source and the perpendicular line passing through P J, and that in the far-field zone is $-H_{i,j}$ $$P_{i,j}^z = \begin{cases} -\dfrac{H_{i,j}}{R_i}P_{i,j}^x = -\dfrac{H_{i,j}}{2}, & 0 \leq \dfrac{R_i}{H_j} \leq 1 \\ -\dfrac{H_{i,j}}{R_i}P_{i,j}^x = -\dfrac{R_i + 8H_{i,j}}{18}, & 1 < \dfrac{R_i}{H_{i,j}} < 10 \\ -H_{i,j}, & \dfrac{R_i}{H_{i,j}} \geq 10 \end{cases} \quad (2b)$$

Figure 2B:
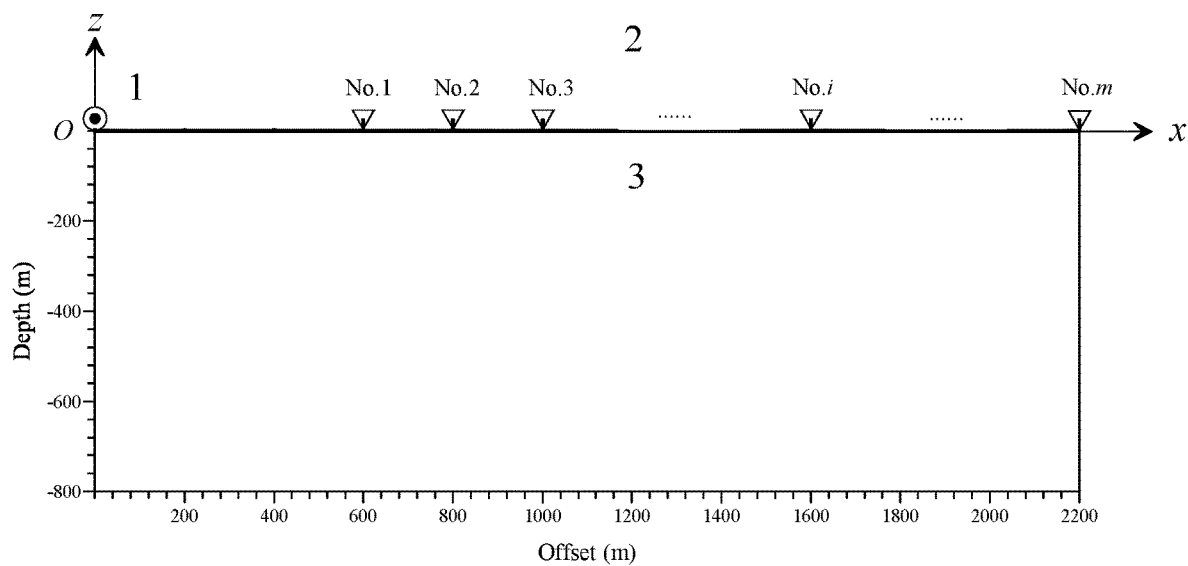
FIG. 2B is the apparent resistivity-depth section of the axial configuration and apparent resistivity-depth section on the xOz plane.

The positions of the recording point are the assignment point for the apparent resistivity $\rho_{i,j}^a$ of each observation point of the axial configuration on the xOz plane. One survey line of the axial configuration generates one apparent resistivity-depth section along the survey line (FIG. 2B).

Figure 3A:
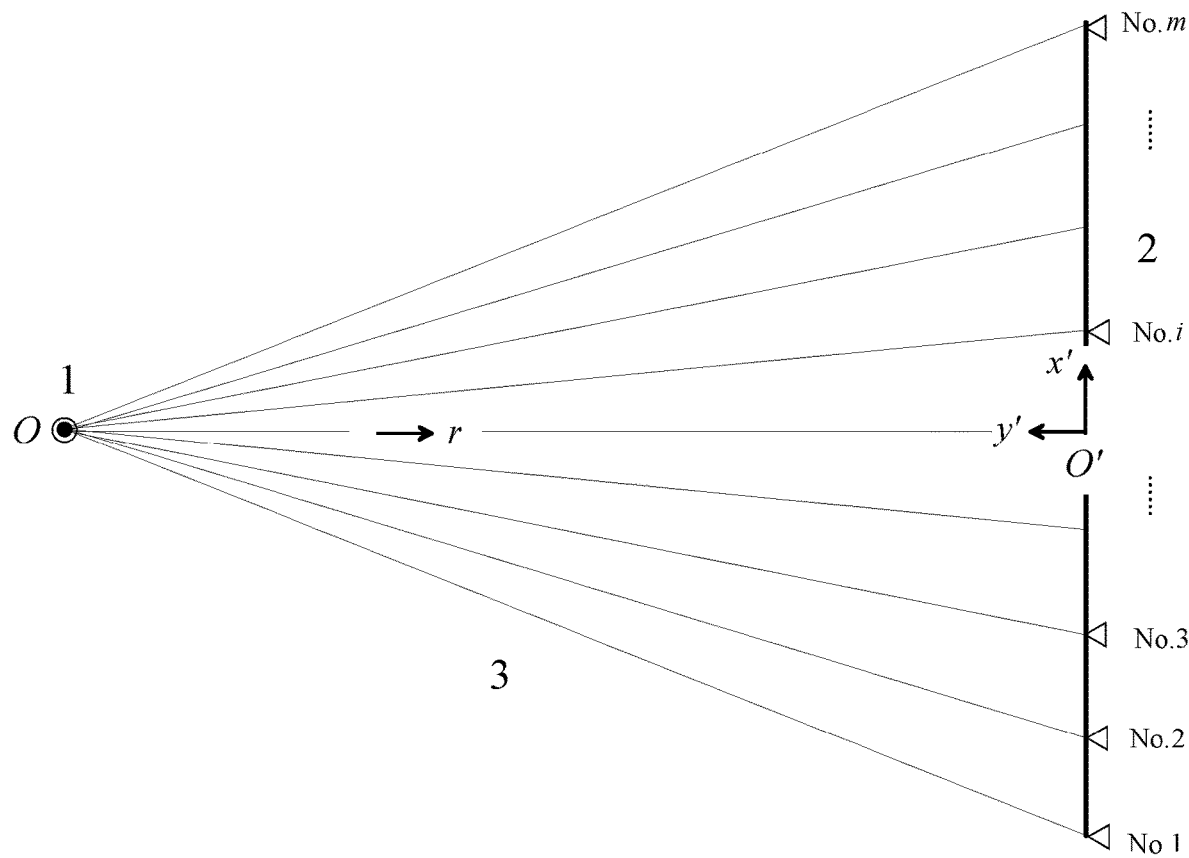
FIG. 3A is the arranged plan of the equatorial configuration and apparent resistivity-depth section.

(2) The equatorial configuration is as shown in FIG. 3A. Assuming that the survey line is arranged along the x'-axis of a rectangular coordinate system, the midpoint of the survey line is taken as the origin O', the source coincides with the origin O of a cylindrical-coordinate system, the line from the source to the observation point is along the r-axis, the part $$\dfrac{R_i}{H_{i,j}} \geq 10$$

in Equation (2) for the recording point of the axial configuration is taken, and the offset $R_i$ is replaced with the position $x_i'$ of each observation point on the x'-axis, then on the x'O'z plane the horizontal position $P_{i,j}^{x'}$ and the vertical position $P_{i,j}^z$ of the recording point for each observation point are:

$$P_{i,j}^{x'} = x_i', \text{ if } \dfrac{R_i}{H_{i,j}} \geq 10 \quad (3a)$$

$$P_{i,j}^z = -H_{i,j}, \text{ if } \dfrac{R_i}{H_{i,j}} \geq 10 \quad (3b)$$

The relationship between the offset $R_i$ and the position $x_i'$ of the observation point is expressed as:

$$R_i = \sqrt{OO'^2 + x_i'^2} \quad (4)$$

The above positions of the recording point are the assignment point for the apparent resistivity $\rho_{i,j}^a$ of the observation point of the equatorial configuration on the x'O'z plane.

If the superscript x in Equation (2) for the recording point of the axial configuration is replaced as r, then on the rOz plane the horizontal position $\rho_{i,j}^r$ and the vertical position $P_{i,j}^z$ of the recording point for each observation point of the equatorial configuration are:

$$P_{i,j}^r = \begin{cases} \dfrac{R_i}{2}, & 0 \leq \dfrac{R_i}{H_{i,j}} \leq 1 \\ \dfrac{R_i}{18}\left(\dfrac{R_i}{H_{i,j}} - 1\right) + \dfrac{R_i}{2}, & 1 < \dfrac{R_i}{H_{i,j}} < 10 \\ R_i, & \dfrac{R_i}{H_{i,j}} \geq 10 \end{cases} \quad (5a)$$

$$P_{i,j}^z = \begin{cases} -\dfrac{H_{i,j}}{R_i}P_{i,j}^r = -\dfrac{H_{i,j}}{2}, & 0 \leq \dfrac{R_i}{H_j} \leq 1 \\ -\dfrac{H_{i,j}}{R_i}P_{i,j}^r = -\dfrac{R_i + 8H_{i,j}}{18}, & 1 < \dfrac{R_i}{H_{i,j}} < 10 \\ -H_{i,j}, & \dfrac{R_i}{H_{i,j}} \geq 10 \end{cases} \quad (5b)$$

The above positions of the recording point are the assignment point for the apparent resistivity $\rho_{i,j}^a$ of each observation point of the equatorial configuration on the rOz plane.

Figure 3B:
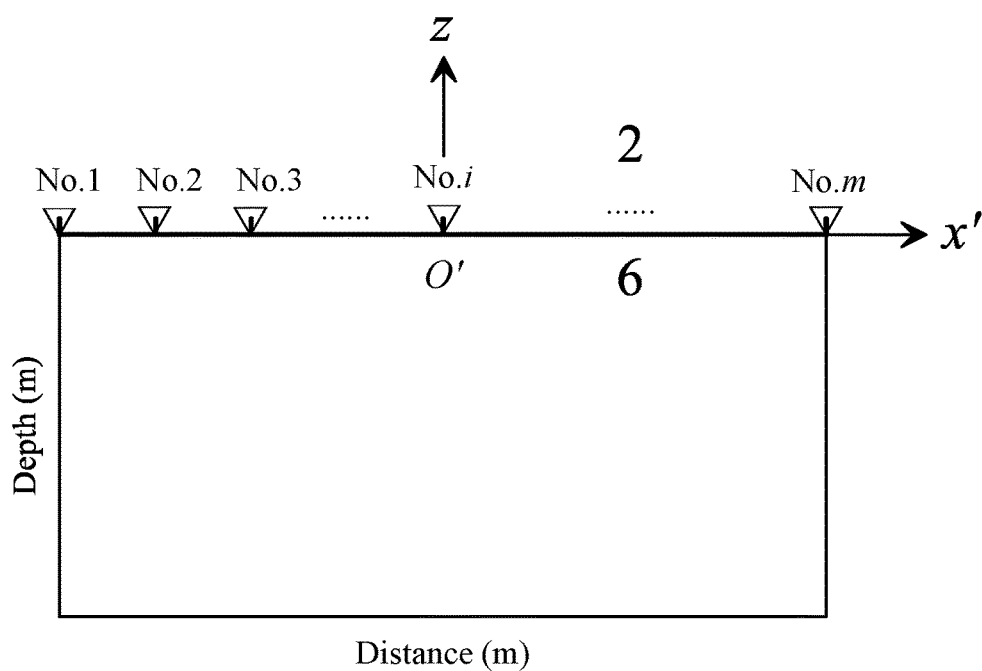
FIG. 3B is the apparent resistivity-depth section of the equatorial configuration and apparent resistivity-depth section on the x'O'z plane.
Figure 3C:
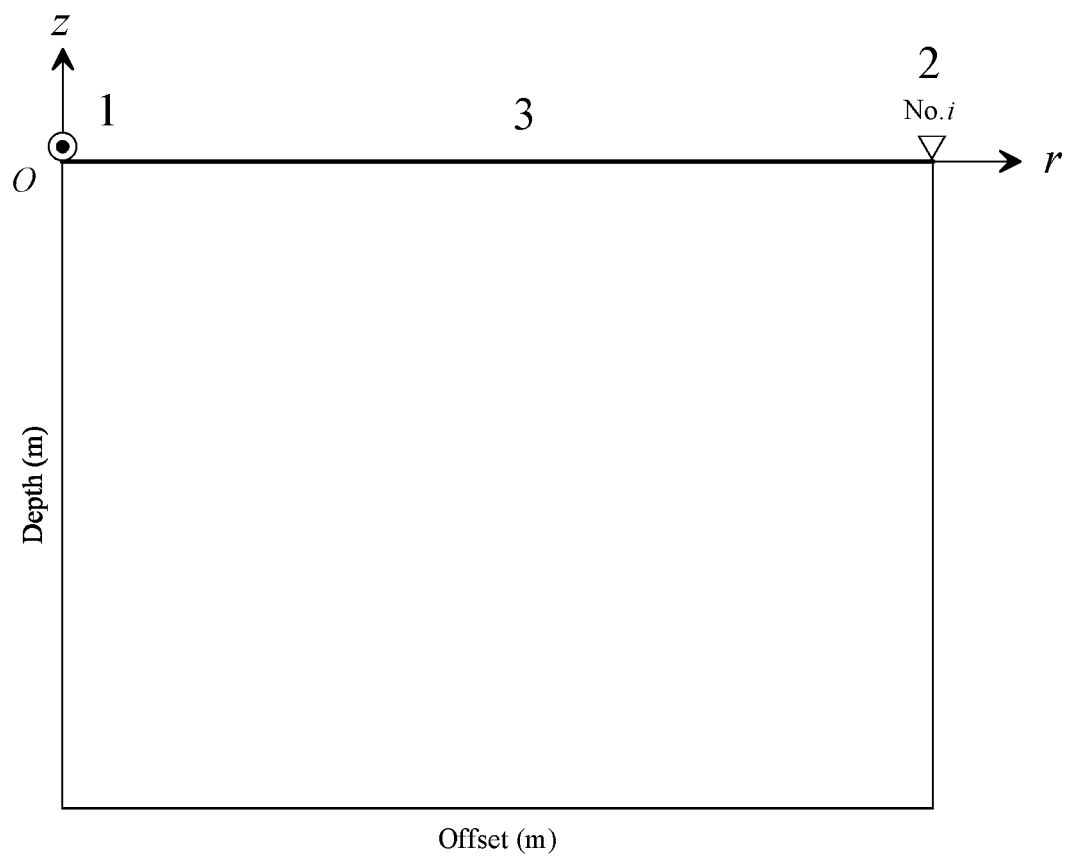
FIG. 3C is the apparent resistivity-depth section of the equatorial configuration and apparent resistivity-depth section on the rOz plane.

Typically, one survey line of the equatorial configuration including m observation points generates one apparent resistivity-depth section along the survey line (FIG. 3B) and m apparent resistivity-depth sections along connecting lines from the observation points to the source. (FIG. 3C illustrates an ith profile).

The present disclosure will be further described below in conjunction with two specific examples.

Figure 4:
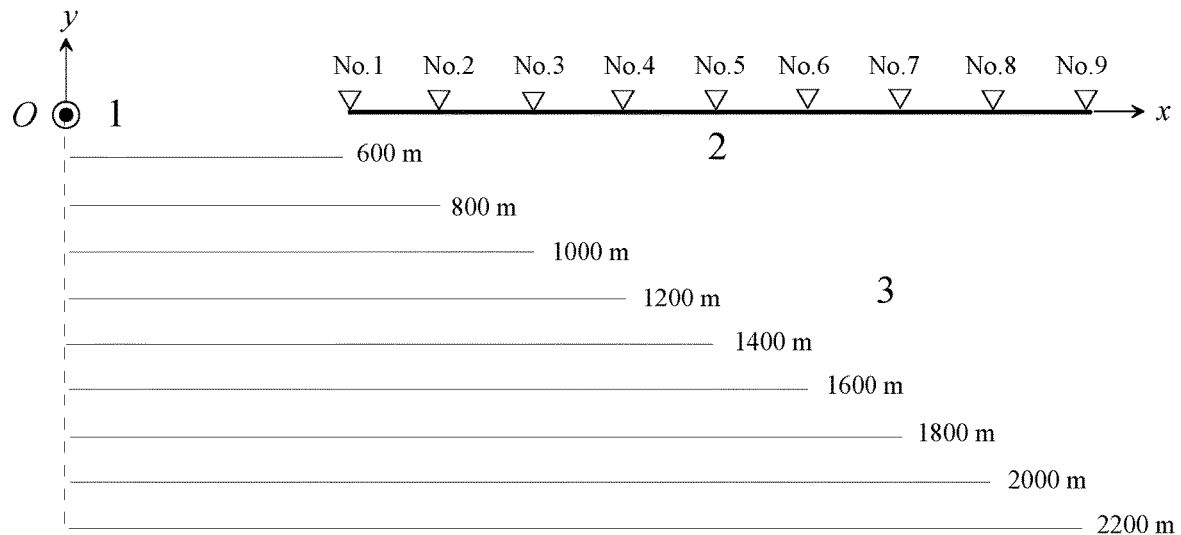
FIG. 4 is the arranged plan of the axial configuration in example 1.

Example 1: Generation of the apparent resistivity-depth section of an axial configuration. FIG. 4 is the arranged plan of the configuration, with nine observation points in total. The right part of Table 1 gives the offsets of each observation point, and the left part gives the geoelectric models for calculating Cagniard apparent resistivities of each observation point:

$$\rho_{i,j}^a = \dfrac{1}{\mu\omega}\dfrac{|E_x|^2}{|H_y|^2}$$

The second column of Table 2 shows operating frequencies of each observation point, and the third column shows calculated results.

TABLE 1

Geoelectric models and offsets for observation points of the axial configuration

| Geoelectric model | Observation point | Offset $R_i$ | Observation point | Offset $R_i$ |
|---|---|---|---|---|
| $\rho_1 = 200\ \Omega \cdot m\ h_1 = 100\ m$ | No. 1 | $R_1 = 600\ m$ | No. 6 | $R_6 = 1600\ m$ |
| $\rho_2 = 100\ \Omega \cdot m\ h_2 = 200\ m$ | No. 2 | $R_2 = 800\ m$ | No. 7 | $R_7 = 1800\ m$ |
| $\rho_3 = 50\ \Omega \cdot m$ | No. 3 | $R_3 = 1000\ m$ | No. 8 | $R_8 = 2000\ m$ |
| | No. 4 | $R_4 = 1200\ m$ | No. 9 | $R_9 = 2200\ m$ |
| Electric source arranged along the x-axis | No. 5 | $R_5 = 1400\ m$ | Observed $E_x$ and $H_y$ components | |

Substituting the Cagniard apparent resistivities $\rho_{i,j}^a$ (third column in Table 2) into Equation (6) yields detection depths $H_{i,j}$, which are listed in the fourth column in Table 2. The fifth column shows induction numbers $$\dfrac{R_i}{H_{i,j}}.$$

Figure 5:
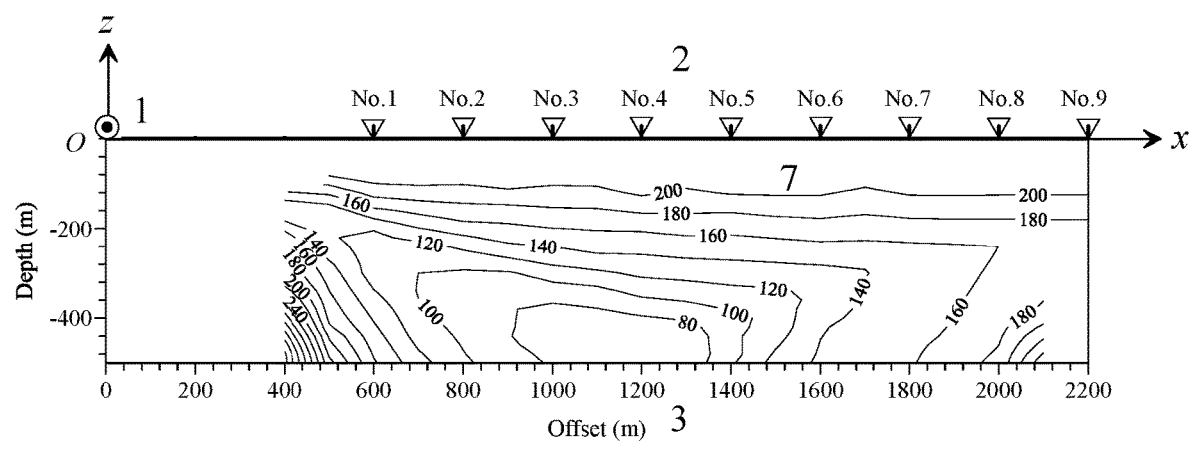
FIG. 5 is the apparent resistivity-depth section of the axial configuration along the survey line in example 1.

For the field zones divided according to Equation (1), substituting the offsets $R_i$ and the detection depths $H_{i,j}$ into Equation (2) yields the horizontal positions $P_{i,j}^x$ and the vertical positions $P_{i,j}^z$ of the recording points for each observation point, which are listed in the sixth and seventh columns of Table 2 respectively to serve as the assignment points for the apparent resistivities $\rho_{i,j}^a$ in the third column. Then in the table, $P_{i,j}^x$ as Column A, $P_{i,j}^z$ as Column B, and $\rho_{i,j}^a$ as Column C are listed in Table 3, thereby forming data of one apparent resistivity-depth section along the survey line. Therefore, the apparent resistivity-depth section drawn with Surfer software is as shown in FIG. 5.

TABLE 2

Operating frequencies, apparent resistivities, detection depths, induction numbers and recording points for each observation point of the axial configuration Recording points of observation point No. 1 ($R_1$ = 600 m) at each of frequencies

| j | $f_{1,j}$/Hz | $\rho^a_{1,j}$/Ω · m | $H_{1,j}$/m | $R_1/H_{1,j}$ | $P^x_{1,j}$/m | $P^z_{1,j}$/m |
|---|---|---|---|---|---|---|
| 1  | 8192 | 209.9 | 80.53 | 7.45 | 515.0 | −69.12 |
| 2  | 4096 | 207.3 | 113.1 | 5.30 | 443.3 | −83.63 |
| 3  | 2048 | 180.3 | 149.2 | 4.01 | 400.6 | −99.67 |
| 4  | 1024 | 138.3 | 184.8 | 3.24 | 374.8 | −115.4 |
| 5  | 512  | 143.9 | 266.6 | 2.24 | 341.6 | −151.8 |
| 6  | 256  | 254.1 | 501.1 | 1.19 | 306.5 | −256.0 |
| 7  | 128  | 527.4 | 1021. | 0.58 | 300.0 | −510.5 |
| 8  | 64   | 1078. | 2064. | 0.29 | 300.0 | −1032. |
| 9  | 32   | 2143. | 4117. | 0.14 | 300.0 | −2058. |
| 10 | 16   | 4207. | 8156. | 0.07 | 300.0 | −4078. |
| 11 | 8    | 8249. | 16152 | 0.03 | 300.0 | −8076. |
| 12 | 4    | 16241 | 32051 | 0.01 | 300.0 | −16025 |

Recording points of observation point No. 2 ($R_2$ = 800 m) at each of frequencies

| j | $f_{2,j}$/Hz | $\rho^a_{2,j}$/Ω · m | $H_{2,j}$/m | $R_2/H_{2,j}$ | $P^x_{2,j}$/m | $P^z_{2,j}$/m |
|---|---|---|---|---|---|---|
| 1  | 8192 | 209.9 | 80.52 | 9.93 | 797.1 | −80.23 |
| 2  | 4096 | 206.1 | 112.8 | 7.08 | 670.6 | −94.59 |
| 3  | 2048 | 192.1 | 154.0 | 5.19 | 586.3 | −112.9 |
| 4  | 1024 | 165.3 | 202.1 | 3.95 | 531.4 | −134.2 |
| 5  | 512  | 129.3 | 252.7 | 3.16 | 496.2 | −156.7 |
| 6  | 256  | 125.8 | 352.7 | 2.26 | 456.3 | −201.2 |
| 7  | 128  | 196.8 | 623.7 | 1.28 | 412.5 | −321.6 |
| 8  | 64   | 393.1 | 1246  | 0.64 | 400.0 | −623.3 |
| 9  | 32   | 802.7 | 2519  | 0.31 | 400.0 | −1259. |
| 10 | 16   | 1602. | 5033  | 0.15 | 400.0 | −2516. |
| 11 | 8    | 3155. | 9989  | 0.08 | 400.0 | −4994. |
| 12 | 4    | 6200. | 19804 | 0.04 | 400.0 | −9902. |

Recording points of observation point No. 3 ($R_3$ = 1,000 m) at each of frequencies

| j | $f_{3,j}$/Hz | $\rho^a_{3,j}$/Ω · m | $H_{3,j}$/m | $R_3/H_{3,j}$ | $P^x_{3,j}$/m | $P^z_{3,j}$/m |
|---|---|---|---|---|---|---|
| 1  | 8192 | 209.4 | 80.42 | 12.4 | 1000. | −80.42 |
| 2  | 4096 | 205.4 | 112.6 | 8.87 | 937.5 | −105.6 |
| 3  | 2048 | 190.1 | 153.2 | 6.52 | 806.9 | −123.6 |
| 4  | 1024 | 174.4 | 207.6 | 4.81 | 712.0 | −147.8 |
| 5  | 512  | 148.5 | 270.9 | 3.69 | 649.4 | −175.9 |
| 6  | 256  | 117.0 | 340.0 | 2.94 | 607.8 | −206.7 |
| 7  | 128  | 112.6 | 471.8 | 2.11 | 562.1 | −265.2 |
| 8  | 64   | 177.4 | 837.5 | 1.19 | 510.7 | −427.8 |
| 9  | 32   | 360.5 | 1688  | 0.59 | 500.0 | −844.1 |
| 10 | 16   | 741.6 | 3424  | 0.29 | 500.0 | −1712. |
| 11 | 8    | 1485. | 6853  | 0.14 | 500.0 | −3426. |
| 12 | 4    | 2933. | 13620 | 0.07 | 500.0 | −6810. |

Recording points of observation point No. 4 ($R_4$ = 1,200 m) at each of frequencies

| j | $f_{4,j}$/Hz | $\rho^a_{4,j}$/Ω · m | $H_{4,j}$/m | $R_4/H_{4,j}$ | $P^x_{4,j}$/m | $P^z_{4,j}$/m |
|---|---|---|---|---|---|---|
| 1  | 8192 | 209.3 | 80.40 | 14.9 | 1200. | −80.40 |
| 2  | 4096 | 206.8 | 113.0 | 10.6 | 1200. | −113.0 |
| 3  | 2048 | 189.3 | 152.9 | 7.84 | 1056. | −134.6 |
| 4  | 1024 | 173.5 | 207.0 | 5.79 | 919.6 | −158.7 |
| 5  | 512  | 157.7 | 279.2 | 4.29 | 819.8 | −190.7 |
| 6  | 256  | 129.0 | 357.1 | 3.35 | 757.3 | −225.4 |
| 7  | 128  | 99.13 | 442.6 | 2.71 | 714.0 | −263.4 |
| 8  | 64   | 104.5 | 643.0 | 1.86 | 657.7 | −352.4 |
| 9  | 32   | 188.3 | 1220. | 0.98 | 600.0 | −610.1 |
| 10 | 16   | 396.8 | 2505. | 0.47 | 600.0 | −1252. |
| 11 | 8    | 816.5 | 5081. | 0.23 | 600.0 | −2540. |
| 12 | 4    | 1632. | 10161 | 0.11 | 600.0 | −5080. |

TABLE 2-continued

Operating frequencies, apparent resistivities, detection depths, induction numbers and recording points for each observation point of the axial configuration Recording points at of observation point No. 5 ($R_5$ = 1,400 m) at each of frequencies

| j | $f_{5,j}$/Hz | $\rho^a_{5,j}/\Omega \cdot m$ | $H_{5,j}$/m | $R_5/H_{5,j}$ | $P^x_{5,j}$/m | $P^z_{5,j}$/m |
|---|---|---|---|---|---|---|
| 1 | 8192 | 209.3 | 80.40 | 17.4 | 1400. | −80.40 |
| 2 | 4096 | 205.2 | 112.6 | 12.4 | 1400. | −112.6 |
| 3 | 2048 | 188.9 | 152.7 | 9.16 | 1334. | −145.6 |
| 4 | 1024 | 172.4 | 206.4 | 6.78 | 1149. | −169.5 |
| 5 | 512 | 158.8 | 280.1 | 4.99 | 1010. | −202.3 |
| 6 | 256 | 137.5 | 368.7 | 3.79 | 917.5 | −241.6 |
| 7 | 128 | 104.9 | 455.3 | 3.07 | 861.3 | −280.1 |
| 8 | 64 | 82.83 | 572.2 | 2.44 | 812.5 | −332.1 |
| 9 | 32 | 114.3 | 950.7 | 1.47 | 736.7 | −500.3 |
| 10 | 16 | 237.2 | 1937. | 0.72 | 700.0 | −968.5 |
| 11 | 8 | 503.5 | 3990. | 0.35 | 700.0 | −1995. |
| 12 | 4 | 1025. | 8052. | 0.17 | 700.0 | −4026. |

Recording points at of observation point No. 6 ($R_6$ = 1,600 m) at each of frequencies

| j | $f_{6,j}$/Hz | $\rho^a_{6,j}/\Omega \cdot m$ | $H_{6,j}$/m | $R_6/H_{6,j}$ | $P^x_{6,j}$/m | $P^z_{6,j}$/m |
|---|---|---|---|---|---|---|
| 1 | 8192 | 209.3 | 80.40 | 19.9 | 1600. | −80.40 |
| 2 | 4096 | 205.1 | 112.5 | 14.2 | 1600. | −112.5 |
| 3 | 2048 | 189.3 | 152.9 | 10.4 | 1600. | −152.9 |
| 4 | 1024 | 171.9 | 206.1 | 7.76 | 1401. | −180.5 |
| 5 | 512 | 157.9 | 279.3 | 5.72 | 1220. | −213.0 |
| 6 | 256 | 140.3 | 372.3 | 4.29 | 1093. | −254.3 |
| 7 | 128 | 112.7 | 472.0 | 3.38 | 1012. | −298.6 |
| 8 | 64 | 80.55 | 564.3 | 2.83 | 963.1 | −339.6 |
| 9 | 32 | 81.52 | 802.8 | 1.99 | 888.0 | −445.7 |
| 10 | 16 | 154.8 | 1564. | 1.02 | 802.0 | −784.2 |
| 11 | 8 | 336.9 | 3264. | 0.49 | 800.0 | −1632. |
| 12 | 4 | 701.4 | 6661. | 0.24 | 800.0 | −3330. |

Recording points of observation point No. 7 ($R_7$ = 1,800 m) at each of frequencies

| j | $f_{7,j}$/Hz | $\rho^a_{7,j}/\Omega \cdot m$ | $H_{7,j}$/m | $R_7/H_{7,j}$ | $P^x_{7,j}$/m | $P^z_{7,j}$/m |
|---|---|---|---|---|---|---|
| 1 | 8192 | 209.2 | 80.39 | 22.3 | 1800. | −80.39 |
| 2 | 4096 | 205.0 | 112.5 | 15.9 | 1800. | −112.5 |
| 3 | 2048 | 188.8 | 152.7 | 11.7 | 1800. | −152.7 |
| 4 | 1024 | 171.7 | 205.9 | 8.73 | 1673. | −191.5 |
| 5 | 512 | 157.2 | 278.7 | 6.45 | 1445. | −223.8 |
| 6 | 256 | 140.1 | 372.1 | 4.83 | 1283. | −265.4 |
| 7 | 128 | 117.6 | 482.1 | 3.73 | 1173. | −314.3 |
| 8 | 64 | 85.09 | 580.0 | 3.10 | 1110. | −357.7 |
| 9 | 32 | 68.05 | 733.3 | 2.45 | 1045. | −426.0 |
| 10 | 16 | 108.8 | 1311. | 1.37 | 937.1 | −683.1 |
| 11 | 8 | 238.9 | 2749. | 0.65 | 900.0 | −1374. |
| 12 | 4 | 509.6 | 5677. | 0.31 | 900.0 | −2838. |

Recording points of observation point No. 8 ($R_8$ = 2,000 m) at each of frequencies

| j | $f_{8,j}$/Hz | $\rho^a_{8,j}/\Omega \cdot m$ | $H_{8,j}$/m | $R_8/H_{8,j}$ | $P^x_{8,j}$/m | $P^z_{8,j}$/m |
|---|---|---|---|---|---|---|
| 1 | 8192 | 209.2 | 80.39 | 24.8 | 2000. | −80.39 |
| 2 | 4096 | 205.0 | 112.5 | 17.7 | 2000. | −112.5 |
| 3 | 2048 | 188.7 | 152.6 | 13.0 | 2000. | −152.6 |
| 4 | 1024 | 171.5 | 205.8 | 9.71 | 1968. | −202.6 |
| 5 | 512 | 156.8 | 278.4 | 7.18 | 1687. | −234.8 |
| 6 | 256 | 139.3 | 371.1 | 5.38 | 1487. | −276.0 |
| 7 | 128 | 119.4 | 485.9 | 4.11 | 1346. | −327.1 |
| 8 | 64 | 90.93 | 599.5 | 3.33 | 1259. | −377.5 |
| 9 | 32 | 64.32 | 713.1 | 2.80 | 1200. | −428.0 |
| 10 | 16 | 82.24 | 1140. | 1.75 | 1083. | −617.9 |
| 11 | 8 | 176.8 | 2364. | 0.84 | 1000. | −1182. |
| 12 | 4 | 386.2 | 4942. | 0.40 | 1000. | −2471. |

Recording points of observation point No. 9 ($R_9$ = 2,200 m) at each of frequencies

| j | $f_{9,j}$/Hz | $\rho^a_{9,j}/\Omega \cdot m$ | $H_{9,j}$/m | $R_9/H_{9,j}$ | $P^x_{9,j}$/m | $P^z_{9,j}$/m |
|---|---|---|---|---|---|---|
| 1 | 8192 | 209.2 | 80.39 | 27.3 | 2200. | −80.39 |
| 2 | 4096 | 204.9 | 112.5 | 19.5 | 2200. | −112.5 |
| 3 | 2048 | 188.5 | 152.6 | 14.4 | 2200. | −152.6 |
| 4 | 1024 | 171.7 | 205.9 | 10.6 | 2200. | −205.9 |
| 5 | 512 | 156.6 | 278.1 | 7.90 | 1944. | −245.8 |

TABLE 2-continued

Operating frequencies, apparent resistivities, detection depths, induction numbers and recording points for each observation point of the axial configuration

| 6  | 256 | 138.7 | 370.2 | 5.94 | 1703. | −286.7 |
| 7  | 128 | 119.4 | 485.9 | 4.52 | 1531. | −338.2 |
| 8  | 64  | 95.73 | 615.1 | 3.57 | 1414. | −395.6 |
| 9  | 32  | 65.54 | 719.8 | 3.05 | 1351. | −442.1 |
| 10 | 16  | 66.87 | 1028. | 2.13 | 1239. | −579.2 |
| 11 | 8   | 135.3 | 2068. | 1.06 | 1107. | −1041. |
| 12 | 4   | 301.6 | 4368. | 0.50 | 1100. | −2184. |

TABLE 3

Data for plotting the apparent resistivity-depth section of the axial configuration
Column A corresponds to $P^x_{ij}$, Column B corresponds to $P^z_{ij}$, and Column C corresponds to $\rho^a_{i,j}$.

| A | B | C |
| --- | --- | --- |
| 515.0 | −69.12 | 209.9 |
| 443.3 | −83.63 | 207.3 |
| 400.6 | −99.67 | 180.3 |
| 374.8 | −115.4 | 138.3 |
| 341.6 | −151.8 | 143.9 |
| 306.5 | −256.0 | 254.1 |
| 300.0 | −510.5 | 527.4 |
| 300.0 | −1032. | 1078. |
| 300.0 | −2058. | 2143. |
| 300.0 | −4078. | 4207. |
| 300.0 | −8076. | 8249. |
| 300.0 | −16025 | 16241 |
| 797.1 | −80.23 | 209.9 |
| 670.6 | −94.59 | 206.1 |
| 586.3 | −112.9 | 192.1 |
| 531.4 | −134.2 | 165.3 |
| 496.2 | −156.7 | 129.3 |
| 456.3 | −201.2 | 125.8 |
| 412.5 | −321.6 | 196.8 |
| 400.0 | −623.3 | 393.1 |
| 400.0 | −1259. | 802.7 |
| 400.0 | −2516. | 1602. |
| 400.0 | −4994. | 3155. |
| 400.0 | −9902. | 6200. |
| 1000. | −80.42 | 209.4 |
| 937.5 | −105.6 | 205.4 |
| 806.9 | −123.6 | 190.1 |
| 712.0 | −147.8 | 174.4 |
| 649.4 | −175.9 | 148.5 |
| 607.8 | −206.7 | 117.0 |
| 562.1 | −265.2 | 112.6 |
| 510.7 | −427.8 | 177.4 |
| 500.0 | −844.1 | 360.5 |
| 500.0 | −1712. | 741.6 |
| 500.0 | −3426. | 1485. |
| 500.0 | −6810. | 2933. |
| 1200. | −80.40 | 209.3 |
| 1200. | −113.0 | 206.8 |
| 1056. | −134.6 | 189.3 |
| 919.6 | −158.7 | 173.5 |
| 819.8 | −190.7 | 157.7 |
| 757.3 | −225.4 | 129.0 |
| 714.0 | −263.4 | 99.13 |
| 657.7 | −352.4 | 104.5 |
| 600.0 | −610.1 | 188.3 |
| 600.0 | −1252. | 396.8 |
| 600.0 | −2540. | 816.5 |
| 600.0 | −5080. | 1632. |
| 1400. | −80.40 | 209.3 |
| 1400. | −112.6 | 205.2 |
| 1334. | −145.6 | 188.9 |
| 1149. | −169.5 | 172.4 |
| 1010. | −202.3 | 158.8 |
| 917.5 | −241.6 | 137.5 |
| 861.3 | −280.1 | 104.9 |
| 812.5 | −332.1 | 82.83 |
| 736.7 | −500.3 | 114.3 |
| 700.0 | −968.5 | 237.2 |
| 700.0 | −1995. | 503.5 |
| 700.0 | −4026. | 1025. |
| 1600. | −80.40 | 209.3 |
| 1600. | −112.5 | 205.1 |
| 1600. | −152.9 | 189.3 |
| 1401. | −180.5 | 171.9 |
| 1220. | −213.0 | 157.9 |
| 1093. | −254.3 | 140.3 |
| 1012. | −298.6 | 112.7 |
| 963.1 | −339.6 | 80.55 |
| 888.2 | −445.7 | 81.52 |
| 802.0 | −784.2 | 154.8 |
| 800.0 | −1632. | 336.9 |
| 800.0 | −3330. | 701.4 |
| 1800. | −80.39 | 209.2 |
| 1800. | −112.5 | 205.0 |
| 1800. | −152.7 | 188.8 |
| 1673. | −191.5 | 171.7 |
| 1445. | −223.8 | 157.2 |
| 1283. | −265.4 | 140.1 |
| 1173. | −314.3 | 117.6 |
| 1110. | −357.7 | 85.09 |
| 1045. | −426.0 | 68.05 |
| 937.1 | −683.1 | 108.8 |
| 900.0 | −1374. | 238.9 |
| 900.0 | −2838. | 509.6 |
| 2000. | −80.39 | 209.2 |
| 2000. | −112.5 | 205.0 |
| 2000. | −152.6 | 188.7 |
| 1968. | −202.6 | 171.5 |
| 1687. | −234.8 | 156.8 |
| 1487. | −276.0 | 139.3 |
| 1346. | −327.1 | 119.4 |
| 1259. | −377.5 | 90.93 |
| 1200. | −428.0 | 64.32 |
| 1083. | −617.9 | 82.24 |
| 1000. | −1182. | 176.8 |
| 1000. | −2471. | 386.2 |
| 2200. | −80.39 | 209.2 |
| 2200. | −112.5 | 204.9 |
| 2200. | −152.6 | 188.5 |
| 2200. | −205.9 | 171.7 |
| 1944. | −245.8 | 156.6 |
| 1703. | −286.7 | 138.7 |
| 1531. | −338.2 | 119.4 |
| 1414. | −395.6 | 95.73 |
| 1351. | −442.1 | 65.54 |
| 1239. | −579.2 | 66.87 |
| 1107. | −1041. | 135.3 |
| 1100. | −2184. | 301.6 |

Figure 6:
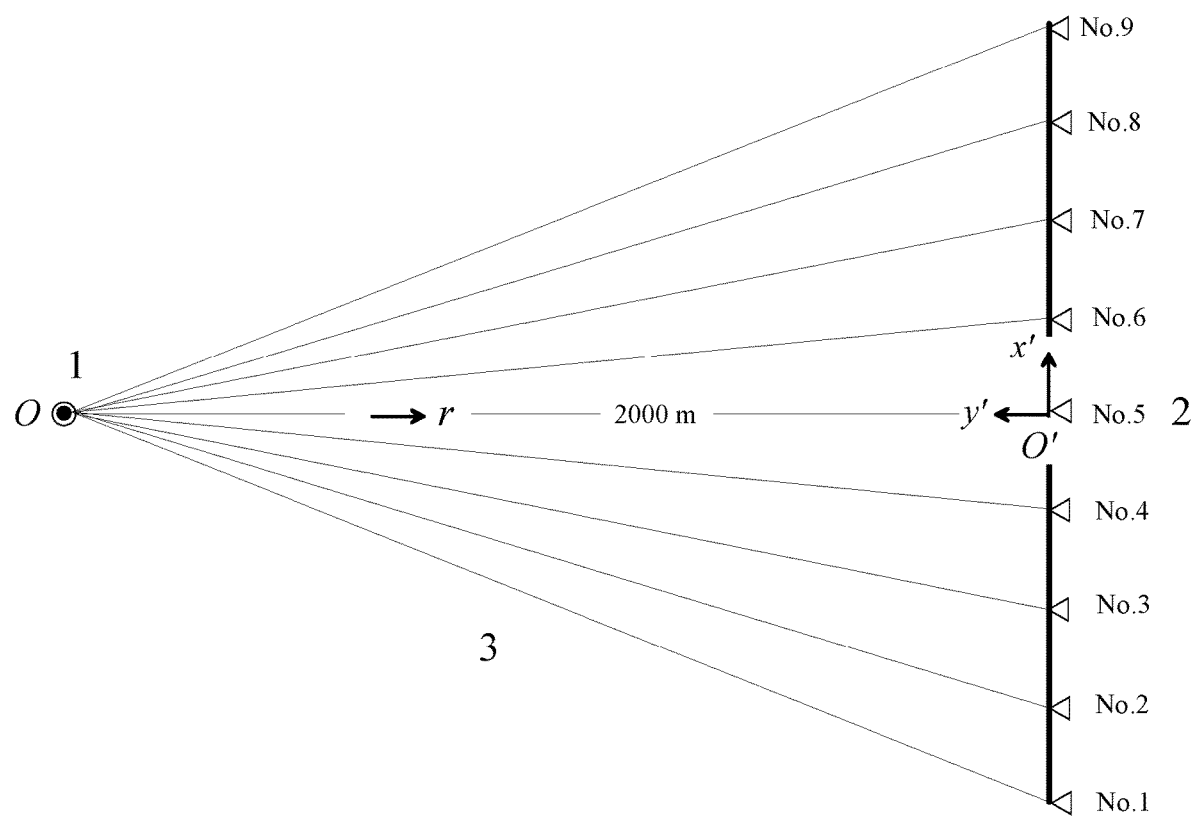
FIG. 6 is the arranged plan of the equatorial configuration in example 2.
Figure 7A:
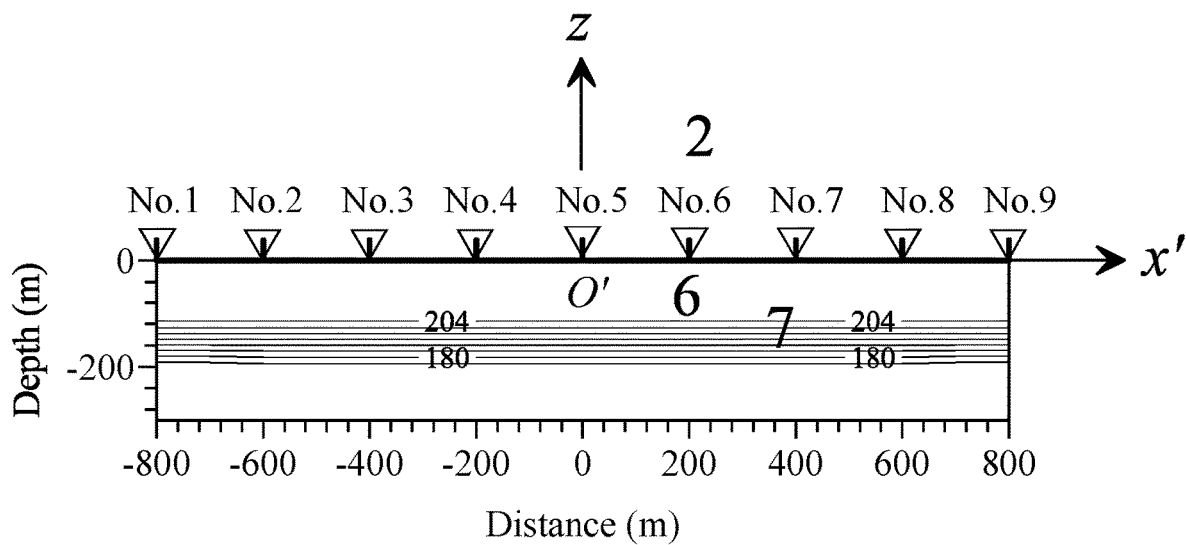
FIG. 7A is the apparent resistivity-depth section along the survey line of an equatorial configuration in example.
Figure 7B:
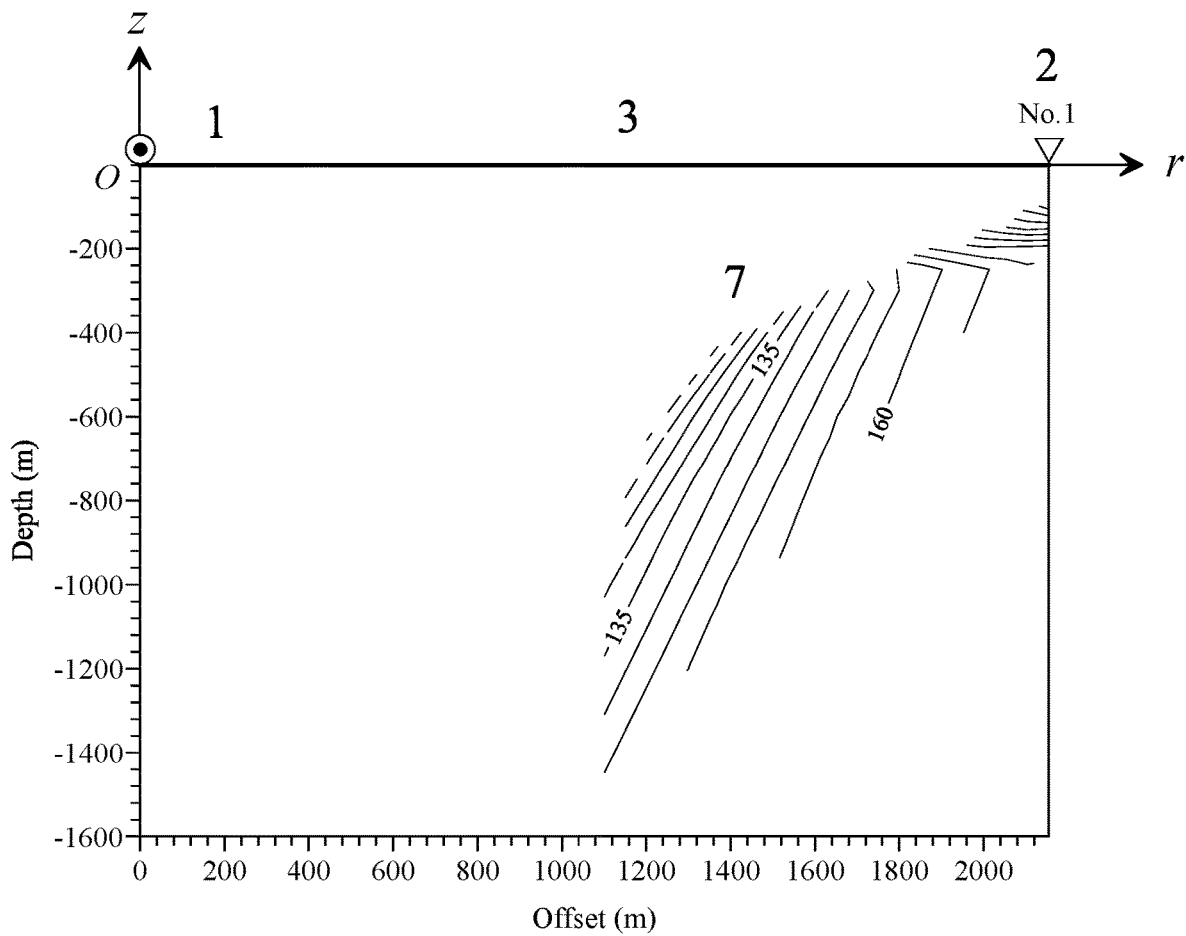
FIGS. 7B, 7C, 7D, 7E and 7F are apparent resistivity-depth sections along connecting lines from observation points No. 1, No. 2, No. 3, No. 4 and No. 5 to the source, respectively.
Figure 7C:
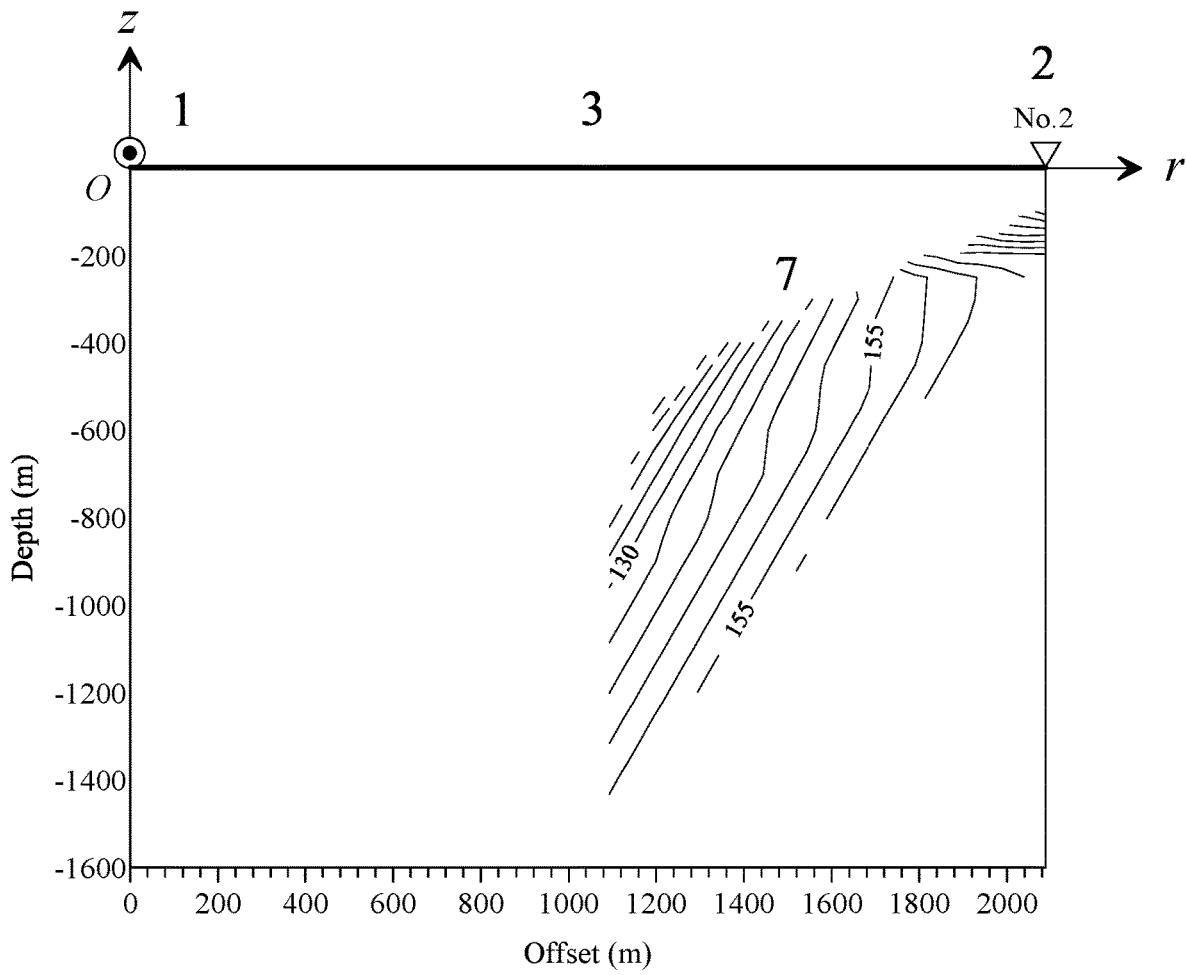
Figure 7D:
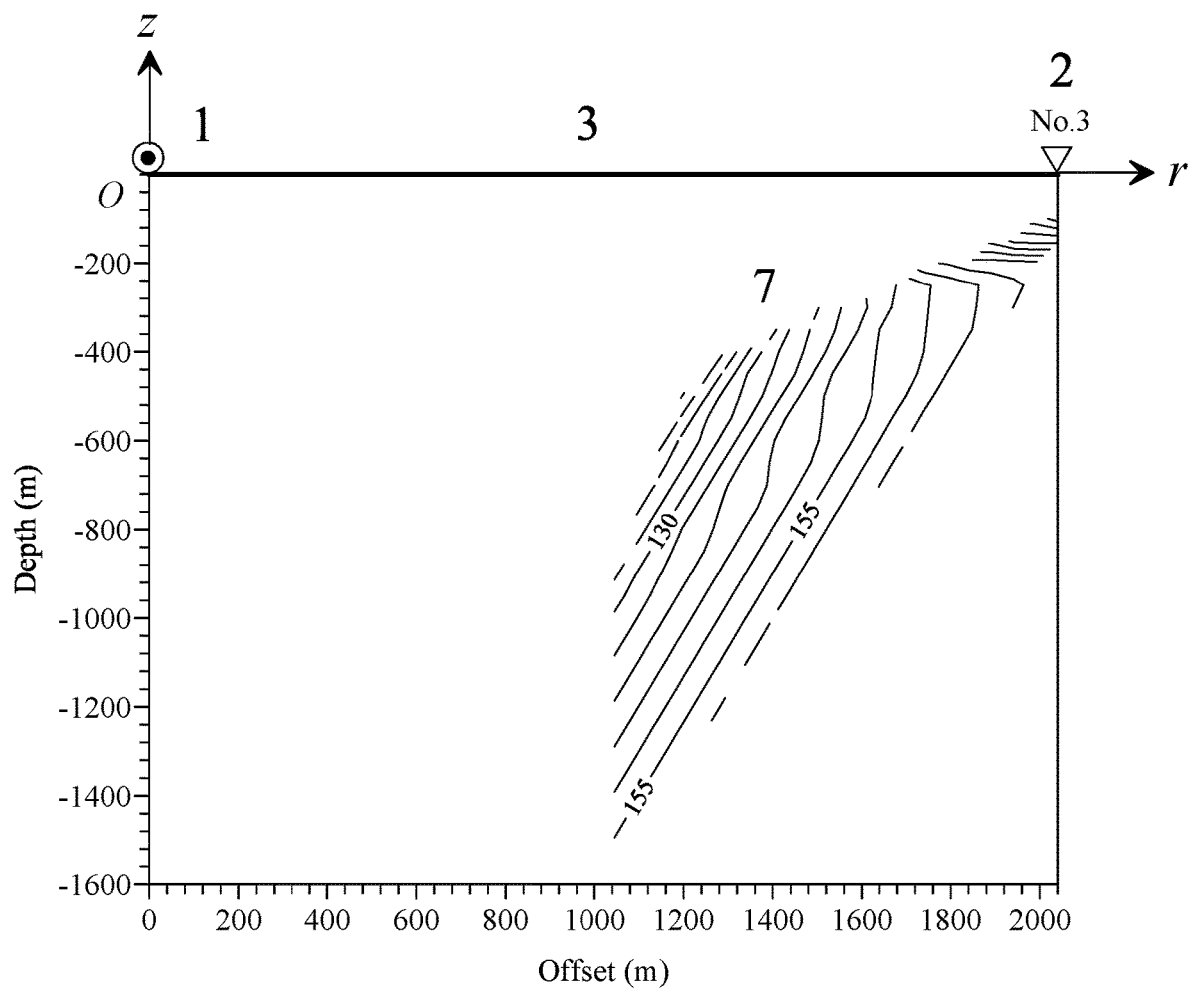
Figure 7E:
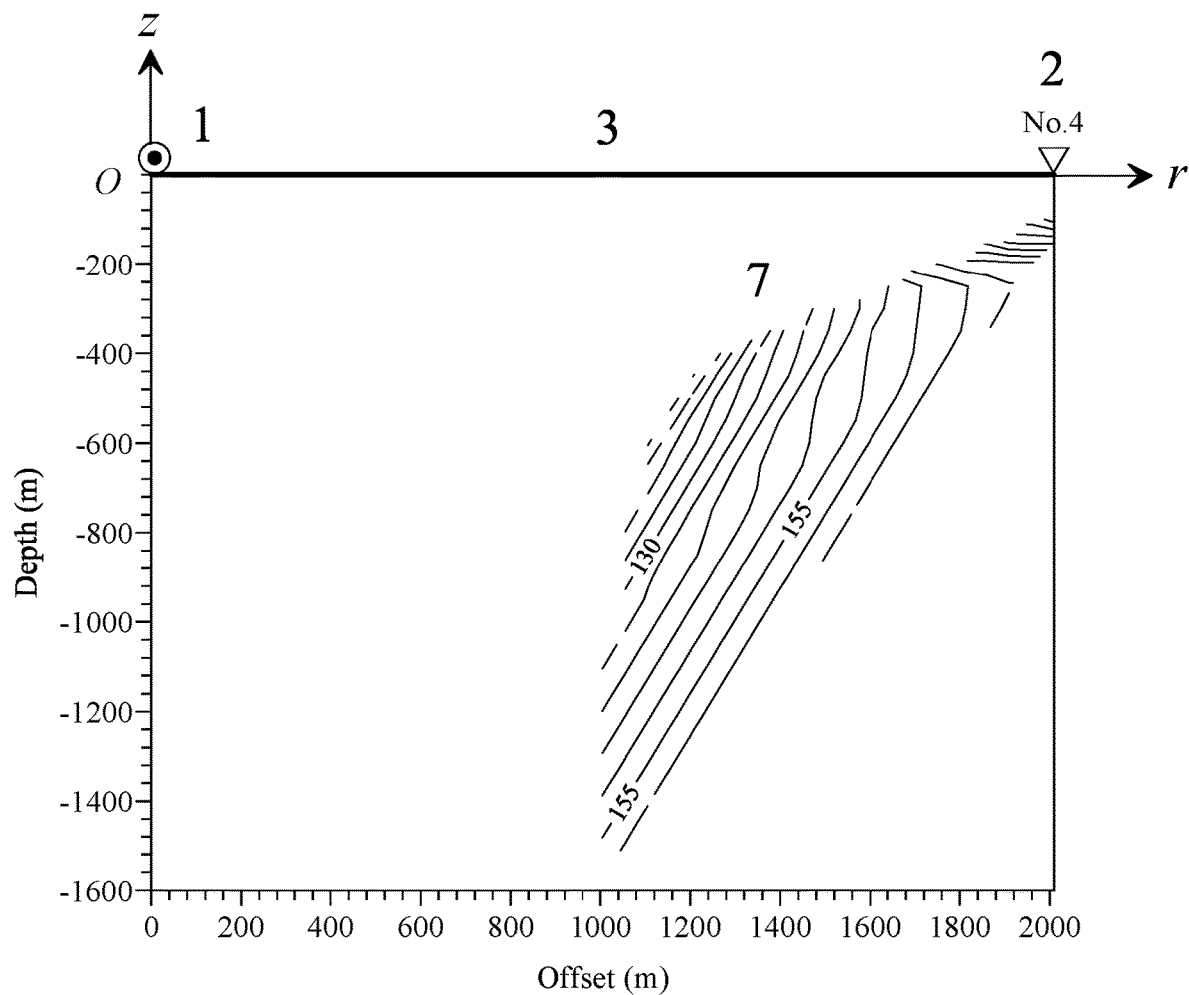
Figure 7F:
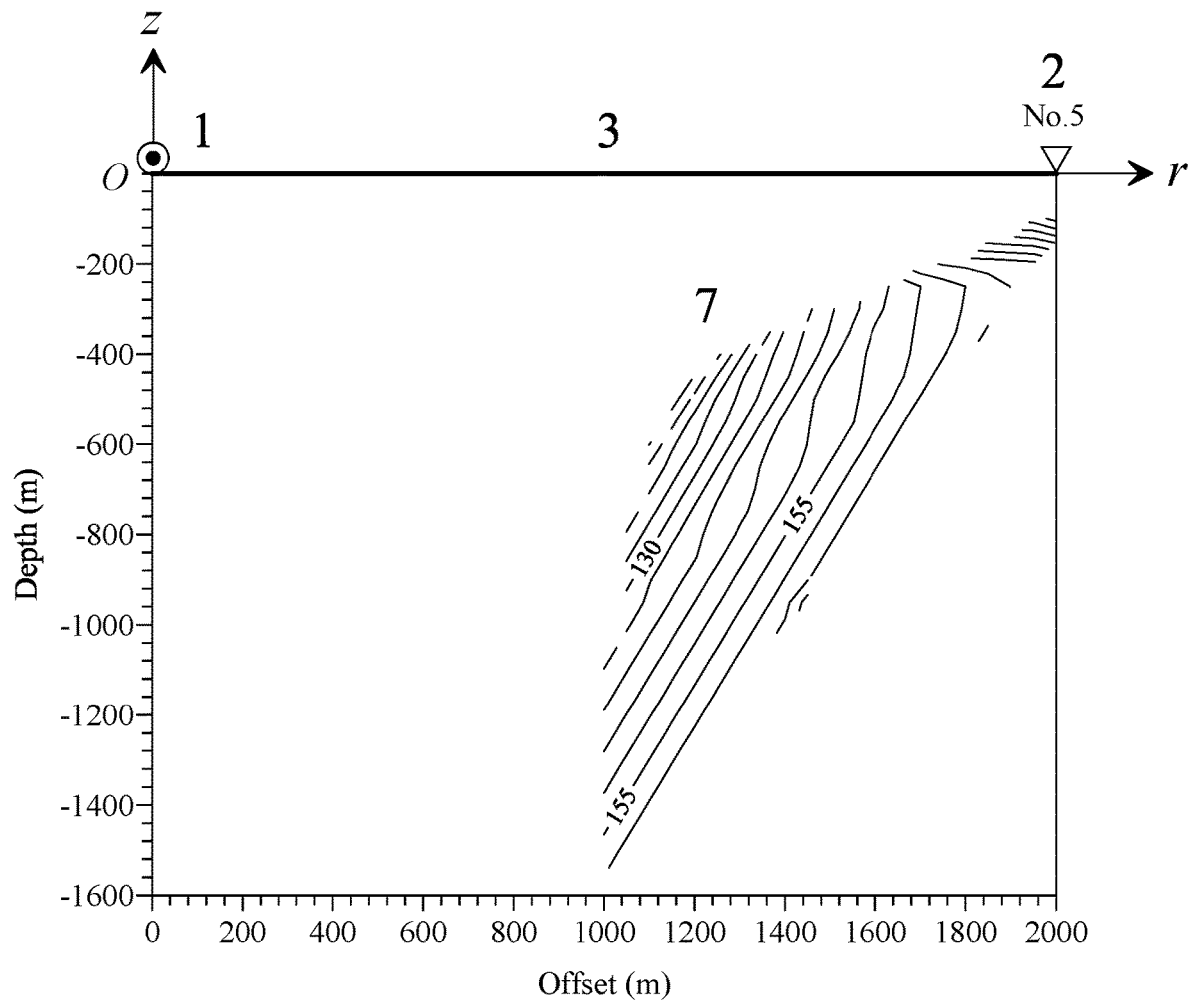

Example 2: Generation of the apparent resistivity-depth section of an equatorial configuration. FIG. 6 is the arranged plan of the configuration. The distance between the survey line and the source is 2,000 m, with nine observation points in total. The right part of Table 4 gives the offsets of each observation point calculated from Equation (4), and the left part gives the geoelectric models for calculating Cagniard apparent resistivities of each observation point:

$$\rho_{i,j}^a = \frac{1}{\mu\omega} \frac{|E_x|^2}{|H_y|^2}$$

The second column of Table 5 shows the operating frequencies of each observation point, and the third column shows calculated results.

TABLE 4

Geoelectric models and offsets for observation points of the equatorial configuration

| Geoelectric model | Observation point | Offset $R_i$ | Observation point | Offset $R_i$ |
|---|---|---|---|---|
| $\rho_1 = 200\,\Omega \cdot m\ h_1 = 100\,m$ | No. 1 | $R_1 = 2154\,m$ | No. 6 | $R_6 = 2010\,m$ |
| $\rho_2 = 100\,\Omega \cdot m\ h_2 = 200\,m$ | No. 2 | $R_2 = 2088\,m$ | No. 7 | $R_7 = 2040\,m$ |
| $\rho_3 = 50\,\Omega \cdot m$ | No. 3 | $R_3 = 2040\,m$ | No. 8 | $R_8 = 2088\,m$ |
| | No. 4 | $R_4 = 2010\,m$ | No. 9 | $R_9 = 2154\,m$ |
| Electric source arranged along the x-axis | No. 5 | $R_5 = 2000\,m$ | Observed $E_x$ and $H_y$ components | |

Substituting the Cagniard apparent resistivities $\rho_{i,j}^a$ (third column in Table 5) into Equation (6) yields detection depths $H_{i,j}$, which are listed in the fourth column in Table 5. The fifth column shows induction numbers $$\frac{R_i}{H_{i,j}}.$$

For the field zones divided according to Equation (1), substituting the offsets $R_i$ and the detection depths $H_{i,j}$, into Equation (3) and Equation (5) yields the horizontal positions $P_{i,j}^r$ and the vertical positions $P_{i,j}^z$ of the recording points for each observation point, which are respectively listed in the sixth and seventh columns of Table 5 to serve as the assignment points for the apparent resistivities $\rho_{i,j}^\alpha$ in the third column. For each observation point selected from the table, $x_i'$, $P_{i,j}^z$ and $\rho_{i,j}^a$ corresponding to the recording point $R_i = P_{i,j}^r$ in the far-field zone are respectively taken as Column A, Column B and Column C to list in No. 1-No. 9 in Table 6, thereby forming data of one apparent resistivity-depth section along the survey line. Then, for each observation point, $P_{i,j}^r$ as Column A, $P_{i,j}^z$ as Column B, and $\rho_{i,j}^a$ as Column C are listed in No. 1-S to No. 9-S in Table 6, thereby forming data of nine apparent resistivity-depth section along connecting lines from the observation points to the source. The apparent resistivity-depth sections drawn from these with the Surfer software are as shown by FIG. 7A-7F (only five sections are drawn due to the symmetry property).

TABLE 5

Operating frequencies, apparent resistivities, detection depths, induction numbers and recording points for each observation point of the equatorial configuration Recording points of observation point No.1 ($R_1 = 2{,}154\,m$, $x'_1 = -800\,m$) at each of frequencies

| j | $f_{1,j}$/Hz | $\rho^a_{1,j}/\Omega \cdot m$ | $H_{1,j}$/m | $R_1/H_{1,j}$ | $P^x_{1,j}$/m | $P^z_{1,j}$/m |
|---|---|---|---|---|---|---|
| 1 | 8192 | 209.1 | 80.36 | 26.8 | 2154. | −80.36 |
| 2 | 4096 | 205.6 | 112.7 | 19.1 | 2154. | −112.7 |
| 3 | 2048 | 190.1 | 153.2 | 14.0 | 2154. | −153.2 |
| 4 | 1024 | 170.5 | 205.2 | 10.4 | 2154. | −205.2 |
| 5 | 512 | 158.8 | 280.1 | 7.68 | 1877. | −244.1 |
| 6 | 256 | 141.6 | 374.2 | 5.75 | 1646. | −285.9 |
| 7 | 128 | 121.9 | 490.9 | 4.38 | 1482. | −337.8 |
| 8 | 64 | 106.3 | 648.5 | 3.32 | 1354. | −407.8 |
| 9 | 32 | 104.6 | 909.4 | 2.36 | 1240. | −523.8 |
| 0 | 16 | 114.1 | 1343. | 1.60 | 1149. | −716.8 |
| 11 | 8 | 128.2 | 2013. | 1.06 | 1085. | −1014. |
| 12 | 4 | 145.7 | 3036. | 0.70 | 1077. | −1518. |

Recording points of observation point No.2 ($R_2 = 2{,}088\,m$, $x'_2 = -600\,m$) at each of frequencies

| j | $f_{2,j}$/Hz | $\rho^a_{2,j}/\Omega \cdot m$ | $H_{2,j}$/m | $R_2/H_{2,j}$ | $P^x_{2,j}$/m | $P^z_{2,j}$/m |
|---|---|---|---|---|---|---|
| 1 | 8192 | 209.1 | 80.36 | 25.9 | 2088. | −80.36 |
| 2 | 4096 | 205.6 | 112.7 | 18.5 | 2088. | −112.7 |
| 3 | 2048 | 190.1 | 153.2 | 13.6 | 2088. | −153.2 |
| 4 | 1024 | 171.8 | 206.0 | 10.1 | 2088. | −206.0 |
| 5 | 512 | 158.8 | 280.1 | 7.45 | 1792. | −240.5 |
| 6 | 256 | 141.8 | 374.3 | 5.57 | 1574. | −282.3 |
| 7 | 128 | 122.2 | 491.6 | 4.24 | 1420. | −334.5 |
| 8 | 64 | 107.1 | 650.9 | 3.20 | 1300. | −405.3 |
| 9 | 32 | 105.0 | 911.5 | 2.29 | 1193. | −521.1 |
| 10 | 16 | 113.7 | 1341. | 1.55 | 1108. | −712.1 |
| 11 | 8 | 128.4 | 2015. | 1.03 | 1048. | −1011. |
| 12 | 4 | 151.2 | 3093. | 0.67 | 1044. | −1546. |

Recording points of observation point No. 3 ($R_3 = 2{,}040\,m$, $x'_3 = -400\,m$) at each of frequencies

| j | $f_{3,j}$/Hz | $\rho^a_{3,j}/\Omega \cdot m$ | $H_{3,j}$/m | $R_3/H_{3,j}$ | $P^x_{3,j}$/m | $P^z_{3,j}$/m |
|---|---|---|---|---|---|---|
| 1 | 8192 | 209.1 | 80.36 | 25.3 | 2040. | −80.36 |
| 2 | 4096 | 205.6 | 112.7 | 18.1 | 2040. | −112.7 |
| 3 | 2048 | 190.1 | 153.2 | 13.3 | 2040. | −153.2 |

TABLE 5-continued

Operating frequencies, apparent resistivities, detection depths, induction numbers and recording points for each observation point of the equatorial configuration

| 4 | 1024 | 172.4 | 206.4 | 9.88 | 2026. | −205.0 |
| 5 | 512 | 158.8 | 280.2 | 7.28 | 1731. | −237.8 |
| 6 | 256 | 141.9 | 374.5 | 5.44 | 1523. | −279.7 |
| 7 | 128 | 122.5 | 492.2 | 4.14 | 1376. | −332.1 |
| 8 | 64 | 107.7 | 652.7 | 3.12 | 1260. | −403.4 |
| 9 | 32 | 105.4 | 913.1 | 2.23 | 1159. | −519.1 |
| 0 | 16 | 113.7 | 1341. | 1.52 | 1079. | −709.4 |
| 11 | 8 | 129.4 | 2023. | 1.00 | 1020. | −1012. |
| 12 | 4 | 156.9 | 3150. | 0.64 | 1020. | −1575. |

Recording points of observation point No.4 ($R_4 = 2{,}010$ m, $x'_4 = -200$ m) at each of frequencies

| j | $f_{4,j}$/Hz | $\rho^a_{4,j}/\Omega \cdot$ m | $H_{4,j}$/m | $R_4/H_{4,j}$ | $P^x_{4,j}$/m | $P^z_{4,j}$/m |
|---|---|---|---|---|---|---|
| 1 | 8192 | 209.1 | 80.37 | 25.0 | 2010. | −80.37 |
| 2 | 4096 | 205.6 | 112.7 | 17.8 | 2010. | −112.7 |
| 3 | 2048 | 190.1 | 153.2 | 13.1 | 2010. | −153.2 |
| 4 | 1024 | 172.5 | 206.4 | 9.73 | 1980. | −203.4 |
| 5 | 512 | 158.9 | 280.2 | 7.17 | 1694. | −236.2 |
| 6 | 256 | 142.0 | 374.6 | 5.36 | 1492. | −278.1 |
| 7 | 128 | 122.7 | 492.6 | 4.08 | 1348. | −330.6 |
| 8 | 64 | 108.1 | 653.8 | 3.07 | 1236. | −402.2 |
| 9 | 32 | 105.7 | 914.2 | 2.19 | 1138. | −517.9 |
| 0 | 16 | 113.8 | 1341. | 1.49 | 1060. | −708.0 |
| 11 | 8 | 130.3 | 2030. | 0.99 | 1005. | −1015. |
| 12 | 4 | 161.0 | 3191. | 0.62 | 1005. | −1595. |

Recording points of observation point No.5 ($R_5 = 2{,}000$ m, $x'_5 = 0$ m) at each of frequencies

| j | $f_{5,j}$/Hz | $\rho^a_{5,j}/\Omega \cdot$ m | $H_{5,j}$/m | $R_5/H_{5,j}$ | $P^x_{5,j}$/m | $P^z_{5,j}$/m |
|---|---|---|---|---|---|---|
| 1 | 8192 | 209.1 | 80.37 | 24.8 | 2000. | −80.37 |
| 2 | 4096 | 205.6 | 112.7 | 17.7 | 2000. | −112.7 |
| 3 | 2048 | 190.1 | 153.2 | 13.0 | 2000. | −153.2 |
| 4 | 1024 | 172.9 | 206.7 | 9.67 | 1963. | −202.9 |
| 5 | 512 | 158.9 | 280.2 | 7.13 | 1681. | −235.6 |
| 6 | 256 | 142.0 | 374.6 | 5.33 | 1481. | −277.6 |
| 7 | 128 | 122.8 | 492.7 | 4.05 | 1339. | −330.1 |
| 8 | 64 | 108.2 | 654.2 | 3.05 | 1228. | −401.8 |
| 9 | 32 | 105.7 | 914.5 | 2.18 | 1131. | −517.5 |
| 10 | 16 | 113.9 | 1342. | 1.49 | 1054. | −707.6 |
| 11 | 8 | 130.6 | 2032. | 0.98 | 1000. | −1016. |
| 12 | 4 | 162.5 | 3206. | 0.62 | 1000. | −1603. |

Recording points of observation point No.6 ($R_6 = 2{,}010$ m, $x'_6 = 200$ m) at each of frequencies

| j | $f_{6,j}$/Hz | $\rho^a_{6,j}/\Omega \cdot$ m | $H_{6,j}$/m | $R_6/H_{6,j}$ | $P^x_{6,j}$/m | $P^z_{6,j}$/m |
|---|---|---|---|---|---|---|
| 1 | 8192 | 209.1 | 80.37 | 25.0 | 2010. | −80.37 |
| 2 | 4096 | 205.6 | 112.7 | 17.8 | 2010. | −112.7 |
| 3 | 2048 | 190.1 | 153.2 | 13.1 | 2010. | −153.2 |
| 4 | 1024 | 172.5 | 206.4 | 9.73 | 1980. | −203.4 |
| 5 | 512 | 158.9 | 280.2 | 7.17 | 1694. | −236.2 |
| 6 | 256 | 142.0 | 374.6 | 5.36 | 1492. | −278.1 |
| 7 | 128 | 122.7 | 492.6 | 4.08 | 1348. | −330.6 |
| 8 | 64 | 108.1 | 653.8 | 3.07 | 1236. | −402.2 |
| 9 | 32 | 105.7 | 914.2 | 2.19 | 1138. | −517.9 |
| 10 | 16 | 113.8 | 1341. | 1.49 | 1060. | −708.0 |
| 11 | 8 | 130.3 | 2030. | 0.99 | 1005. | −1015. |
| 12 | 4 | 161.0 | 3191. | 0.62 | 1005. | −1595. |

Recording points of observation point No.7 ($R_7 = 2{,}040$ m, $x'_7 = 400$ m) at each of frequencies

| j | $f_{7,j}$/Hz | $\rho^a_{7,j}/\Omega \cdot$ m | $H_{7,j}$/m | $R_7/H_{7,j}$ | $P^x_{7,j}$/m | $P^z_{7,j}$/m |
|---|---|---|---|---|---|---|
| 1 | 8192 | 209.1 | 80.36 | 25.3 | 2040. | −80.36 |
| 2 | 4096 | 205.6 | 112.7 | 18.1 | 2040. | −112.7 |
| 3 | 2048 | 190.1 | 153.2 | 13.3 | 2040. | −153.2 |
| 4 | 1024 | 172.4 | 206.4 | 9.88 | 2026. | −205.0 |
| 5 | 512 | 158.8 | 280.2 | 7.28 | 1731. | −237.8 |
| 6 | 256 | 141.9 | 374.5 | 5.44 | 1523. | −279.7 |
| 7 | 128 | 122.5 | 492.2 | 4.14 | 1376. | −332.1 |
| 8 | 64 | 107.7 | 652.7 | 3.12 | 1260. | −403.4 |

TABLE 5-continued

Operating frequencies, apparent resistivities, detection depths, induction numbers and recording points for each observation point of the equatorial configuration

| 9  | 32 | 105.4 | 913.1  | 2.23 | 1159. | −519.1  |
| 10 | 16 | 113.7 | 1341.  | 1.52 | 1079. | −709.4  |
| 11 | 8  | 129.4 | 2023.  | 1.00 | 1020. | −1012.  |
| 12 | 4  | 156.9 | 3150.  | 0.64 | 1020. | −1575.  |

Recording points of observation point No.8 ($R_8 = 2{,}088$ m, $x'_8 = 600$ m) at each of frequencies

| j  | $f_{8,j}$/Hz | $\rho^a_{8,j}/\Omega \cdot m$ | $H_{8,j}$/m | $R_8/H_{8,j}$ | $P^x_{8,j}$/m | $P^z_{8,j}$/m |
|----|------|-------|--------|-------|-------|---------|
| 1  | 8192 | 209.1 | 80.36  | 25.9  | 2088. | −80.36  |
| 2  | 4096 | 205.6 | 112.7  | 18.5  | 2088. | −112.7  |
| 3  | 2048 | 190.1 | 153.2  | 13.6  | 2088. | −153.2  |
| 4  | 1024 | 171.8 | 206.0  | 10.1  | 2088. | −206.0  |
| 5  | 512  | 158.8 | 280.1  | 7.45  | 1792. | −240.5  |
| 6  | 256  | 141.8 | 374.3  | 5.57  | 1574. | −282.3  |
| 7  | 128  | 122.2 | 491.6  | 4.24  | 1420. | −334.5  |
| 8  | 64   | 107.1 | 650.9  | 3.20  | 1300. | −405.3  |
| 9  | 32   | 105.0 | 911.5  | 2.29  | 1193. | −521.1  |
| 10 | 16   | 113.7 | 1341.  | 1.55  | 1108. | −712.1  |
| 11 | 8    | 128.4 | 2015.  | 1.03  | 1048. | −1011.  |
| 12 | 4    | 151.2 | 3093.  | 0.67  | 1044. | −1546.  |

Recording points of observation point No.9 ($R_9 = 2{,}154$ m, $x'_9 = 800$ m) at each of frequencies

| j  | $f_{9,j}$/Hz | $\rho^a_{9,j}/\Omega \cdot m$ | $H_{9,j}$/m | $R_9/H_{9,j}$ | $P^x_{9,j}$/m | $P^z_{9,j}$/m |
|----|------|-------|-------|-------|-------|---------|
| 1  | 8192 | 209.1 | 80.36 | 26.8  | 2154. | −80.36  |
| 2  | 4096 | 205.6 | 112.7 | 19.1  | 2154. | −112.7  |
| 3  | 2048 | 190.1 | 153.2 | 14.0  | 2154. | −153.2  |
| 4  | 1024 | 170.5 | 205.2 | 10.4  | 2154. | −205.2  |
| 5  | 512  | 158.8 | 280.1 | 7.68  | 1877. | −244.1  |
| 6  | 256  | 141.6 | 374.2 | 5.75  | 1646. | −285.9  |
| 7  | 128  | 121.9 | 490.9 | 4.38  | 1482. | −337.8  |
| 8  | 64   | 106.3 | 648.5 | 3.32  | 1354. | −407.8  |
| 9  | 32   | 104.6 | 909.4 | 2.36  | 1240. | −523.8  |
| 10 | 16   | 114.1 | 1343. | 1.60  | 1149. | −716.8  |
| 11 | 8    | 128.2 | 2013. | 1.06  | 1085. | −1014.  |
| 12 | 4    | 145.7 | 3036. | 0.70  | 1077. | −1518.  |

TABLE 6

Data for plotting the apparent resistivity-depth section of the equatorial configuration
Column A corresponds to $x'_1$ or $P^x_{ij}$, Column B corresponds to $P^z_{ij}$, and Column C corresponds to $\rho^a_{ij}$.

No.1-No.9

| A | B | C |
|---|---|---|
| −800.0 | −80.36 | 209.1 |
| −800.0 | −112.7 | 205.6 |
| −800.0 | −153.2 | 190.1 |
| −800.0 | −205.2 | 170.5 |
| −600.0 | −80.36 | 209.1 |
| −600.0 | −112.7 | 205.6 |
| −600.0 | −153.2 | 190.1 |
| −600.0 | −206.0 | 171.8 |
| −400.0 | −80.36 | 209.1 |
| −400.0 | −112.7 | 205.6 |
| −400.0 | −153.2 | 190.1 |
| −200.0 | −80.37 | 209.1 |
| −200.0 | −112.7 | 205.6 |
| −200.0 | −153.2 | 190.1 |
| 0.0    | −80.37 | 209.1 |
| 0.0    | −112.7 | 205.6 |
| 0.0    | −153.2 | 190.1 |
| 200.0  | −80.37 | 209.1 |
| 200.0  | −112.7 | 205.6 |
| 200.0  | −153.2 | 190.1 |
| 400.0  | −80.36 | 209.1 |
| 400.0  | −112.7 | 205.6 |
| 400.0  | −153.2 | 190.1 |
| 600.0  | −80.36 | 209.1 |
| 600.0  | −112.7 | 205.6 |
| 600.0  | −153.2 | 190.1 |
| 600.0  | −206.0 | 171.8 |
| 800.0  | −80.36 | 209.1 |
| 800.0  | −112.7 | 205.6 |
| 800.0  | −153.2 | 190.1 |
| 800.0  | −205.2 | 170.5 |

No.1-Source

| A | B | C |
|---|---|---|
| 2154. | −80.36  | 209.1 |
| 2154. | −112.7  | 205.6 |
| 2154. | −153.2  | 190.1 |
| 2154. | −205.2  | 170.5 |
| 1877. | −244.1  | 158.8 |
| 1646. | −285.9  | 141.6 |
| 1482. | −337.8  | 121.9 |
| 1354. | −407.8  | 106.3 |
| 1240. | −523.8  | 104.6 |
| 1149. | −716.8  | 114.1 |
| 1085. | −1014.  | 128.2 |
| 1077. | −1518.  | 145.7 |

TABLE 6-continued

Data for plotting the apparent resistivity-depth section of the equatorial configuration Column A corresponds to $x'_1$ or $P^r_{ij}$, Column B corresponds to $P^z_{ij}$, and Column C corresponds to $\rho^a_{i,j}$.

No.2-Source

| A | B | C |
|---|---|---|
| 2088. | −80.36 | 209.1 |
| 2088. | −112.7 | 205.6 |
| 2088. | −153.2 | 190.1 |
| 2088. | −206.0 | 171.8 |
| 1792. | −240.5 | 158.8 |
| 1574. | −282.3 | 141.8 |
| 1420. | −334.5 | 122.2 |
| 1300. | −405.3 | 107.1 |
| 1193. | −521.1 | 105.0 |
| 1108. | −712.1 | 113.7 |
| 1048. | −1011. | 128.4 |
| 1044. | −1546. | 151.2 |

No.3-Source

| A | B | C |
|---|---|---|
| 2040. | −80.36 | 209.1 |
| 2040. | −112.7 | 205.6 |
| 2040. | −153.2 | 190.1 |
| 2026. | −205.0 | 172.4 |
| 1731. | −237.8 | 158.8 |
| 1523. | −279.7 | 141.9 |
| 1376. | −332.1 | 122.5 |
| 1260. | −403.4 | 107.7 |
| 1159. | −519.1 | 105.4 |
| 1079. | −709.4 | 113.7 |
| 1020. | −1012. | 129.4 |
| 1020. | −1575. | 156.9 |

No.4-Source

| A | B | C |
|---|---|---|
| 2010. | −80.37 | 209.1 |
| 2010. | −112.7 | 205.6 |
| 2010. | −153.2 | 190.1 |
| 1980. | −203.4 | 172.5 |
| 1694. | −236.2 | 158.9 |
| 1492. | −278.1 | 142.0 |
| 1348. | −330.6 | 122.7 |
| 1236. | −402.2 | 108.1 |
| 1138. | −517.9 | 105.7 |
| 1060. | −708.0 | 113.8 |
| 1005. | −1015. | 130.3 |
| 1005. | −1595. | 161.0 |

No.5-Source

| A | B | C |
|---|---|---|
| 2000. | −80.37 | 209.1 |
| 2000. | −112.7 | 205.6 |
| 2000. | −153.2 | 190.1 |
| 1963. | −202.9 | 172.9 |
| 1681. | −235.6 | 158.9 |
| 1481. | −277.6 | 142.0 |
| 1339. | −330.1 | 122.8 |
| 1228. | −401.8 | 108.2 |
| 1131. | −517.5 | 105.7 |
| 1054. | −707.6 | 113.9 |
| 1000. | −1016. | 130.6 |
| 1000. | −1603. | 162.5 |

No.6-Source

| A | B | C |
|---|---|---|
| 2010. | −80.37 | 209.1 |
| 2010. | −112.7 | 205.6 |
| 2010. | −153.2 | 190.1 |
| 1980. | −203.4 | 172.5 |
| 1694. | −236.2 | 158.9 |
| 1492. | −278.1 | 142.0 |
| 1348. | −330.6 | 122.7 |
| 1236. | −402.2 | 108.1 |
| 1138. | −517.9 | 105.7 |
| 1060. | −708.0 | 113.8 |
| 1005. | −1015. | 130.3 |
| 1005. | −1595. | 161.0 |

No.7-Source

| A | B | C |
|---|---|---|
| 2040. | −80.36 | 209.1 |
| 2040. | −112.7 | 205.6 |
| 2040. | −153.2 | 190.1 |
| 2026. | −205.0 | 172.4 |
| 1731. | −237.8 | 158.8 |
| 1523. | −279.7 | 141.9 |
| 1376. | −332.1 | 122.5 |
| 1260. | −403.4 | 107.7 |
| 1159. | −519.1 | 105.4 |
| 1079. | −709.4 | 113.7 |
| 1020. | −1012. | 129.4 |
| 1020. | −1575. | 156.9 |

No.8-Source

| A | B | C |
|---|---|---|
| 2088. | −80.36 | 209.1 |
| 2088. | −112.7 | 205.6 |
| 2088. | −153.2 | 190.1 |
| 2088. | −206.0 | 171.8 |
| 1792. | −240.5 | 158.8 |
| 1574. | −282.3 | 141.8 |
| 1420. | −334.5 | 122.2 |
| 1300. | −405.3 | 107.1 |
| 1193. | −521.1 | 105.0 |
| 1108. | −712.1 | 113.7 |
| 1048. | −1011. | 128.4 |
| 1044. | −1546. | 151.2 |

No.9-Source

| A | B | C |
|---|---|---|
| 2154. | −80.36 | 209.1 |
| 2154. | −112.7 | 205.6 |
| 2154. | −153.2 | 190.1 |
| 2154. | −205.2 | 170.5 |
| 1877. | −244.1 | 158.8 |
| 1646. | −285.9 | 141.6 |
| 1482. | −337.8 | 121.9 |
| 1354. | −407.8 | 106.3 |
| 1240. | −523.8 | 104.6 |
| 1149. | −716.8 | 114.1 |
| 1085. | −1014. | 128.2 |
| 2088. | −206.0 | 171.8 |
| 1000. | −1518. | 145.7 |

In addition, according to the present application, the detection depth may be calculated by the following general equations, or other detection depth equations:

$$H_{i,j} \approx 503\sqrt{\frac{\rho^a_{i,j}}{f_{i,j}}}\, m \tag{6}$$

(6)

where $f_{i,j}$ is the jth frequency of the observation point i and $\rho_{i,j}^{\alpha}$ is the apparent resistivity.

The apparent resistivity $\rho_{i,j}^{a}$ can further be obtained from any definition or algorithm, such as a single-component apparent resistivity, or any future improved apparent resistivity definition and algorithm.

The above method is applicable to any configuration with the offset, regardless of an electric source or a magnetic source.

Field observation records further include a position of the source besides the positions of the observation point, so as to determine the offset.

For field zone division in Equations (1), (2), (3), and (5), a value 10 is used as a field zone division standard. The field zone division standard can further be adjusted to other values. Such an adjustment can be made for any configuration, source and observation component.

In conclusion, the present disclosure determines, in field zones divided quantitatively based on an induction number, the positions of the recording point for each observation point and the frequency thereof. The horizontal position of the recording point in the near-field zone is a midpoint of the offset, that in the far-field zone is a position where the observation point is located, and that in the intermediate-field zone moves linearly from the midpoint of the offset to the position where the observation point is located, as the induction number increases. The vertical position of the recording point in the near-field zone and the intermediate-field zone is located at a point of intersection of the line from the detection depth to the source and the perpendicular line passing through the horizontal position of the recording point, and that in the far-field zone is equal to the detection depth. The positions of the recording point are the assignment point for the apparent resistivity corresponding to each observation point and the frequency thereof. One survey line of the axial configuration generates one apparent resistivity-depth section extending along the survey line. One survey line of the equatorial configuration typically generates one apparent resistivity-depth section along the survey line and apparent resistivity-depth sections along connecting lines from the observation points to the source which are the same as observation points in the number. The generated apparent resistivity-depth section provides a simple method to solve the shadow effect caused by nonplanarwaves in short-offset exploration, which widens the application scope of the original apparent resistivity-depth section (Phoenix Geophysics Limited and China University of Geosciences, 2010; Phoenix Geophysics Limited, 2010) interpretation method for representing the geoelectric response below the observation point.

The above examples are only used for illustrating the design ideas and characteristics of the present disclosure, and the purpose thereof is to enable the person skilled in the art to understand the contents of the present disclosure and make implementation; and the protection scope of the present disclosure is not limited to the above examples. Therefore, the equivalent changes or modifications made on the basis of principles and design idea disclosed in the present disclosure are within the protection scope of the present disclosure.

What is claimed is:

1. An apparent resistivity-depth section generating method for a short-offset electromagnetic exploration, comprising:

dividing a field zone according to an induction number, namely a ratio of an offset to a detection depth, and determining positions of a recording point for each of observation points in a near-field zone, an intermediate-field zone and a far-field zone, specifically:

dividing the field zone according to the ratio of the offset $R_i$ to the detection depth $H_{i,j}$ determining the field zone as the near-field zone if $$0 \le \frac{R_i}{H_{i,j}} \le 1 \qquad (1a)$$

as the intermediate-field zone if $$1 < \frac{R_i}{H_{i,j}} < 10 \qquad (1b)$$

as the far-field zone if $$\frac{R_i}{H_{i,j}} \ge 10 \qquad (1c)$$

wherein, i=1, 2, . . . , m, is a serial number of the observation point, and j=1, 2, . . . , n is a serial number of a time window or a frequency; and determining the positions of the recording point for each of the observation points according to the divided zones: a horizontal position of the recording point: the horizontal position of the recording point in the near-field zone is a midpoint of the offset, the horizontal position of the recording point in the far-field zone is a position where the observation point is located, and the horizontal position of the recording point in the intermediate-field zone moves linearly from the midpoint of the offset to the position where the observation point is located; and a vertical position of the recording point: the vertical position of the recording point in the near-field zone and the intermediate-field zone is located at an intersection of a line from the detection depth to a source device and a perpendicular line passing through the horizontal position of the recording point, and the vertical position of the recording point in the far-field zone is equal to the detection depth; and taking the positions of the recording point as an assignment point for an apparent resistivity corresponding to the each observation point and the frequency or the time window thereof, wherein (1) using an axial configuration to collect data from axial observation points, wherein the axial configuration includes the source device emitting electromagnetic waves positioned at an origin O of a rectangular coordinate system, and a survey line including a plurality of sensors that are arranged along an x-axis of the rectangular coordinate system as the axial observation points, then on an xOz plane the horizontal position $P_{i,j}^{x}$ of the recording point for each observation point in the near-field zone is $$P_{i,j}^{x} = \frac{R_i}{2},$$

the horizontal position of the recording point for each observation point in the far-field zone is $P_{i,j}^{x}=R_i$; and the horizontal position $P_{i,j}^x$ of the recording point for each observation point in the intermediate-field zone, the horizontal position $$P_{i,j}^x = \frac{R_i}{2}$$

of the recording point moves linearly from the midpoint of the offset to a receiving point, specifically:

$$P_{i,j}^x = \begin{cases} \frac{R_i}{2}, & 0 \leq \frac{R_i}{H_{i,j}} \leq 1 \\ \frac{R_i}{18}\left(\frac{R_i}{H_{i,j}} - 1\right) + \frac{R_i}{2}, & 1 < \frac{R_i}{H_{i,j}} < 10 \\ R_i, & \frac{R_i}{H_{i,j}} \geq 10 \end{cases} \quad (2a)$$

the vertical position $P_{i,j}^z$ of the recording point for each observation point in the near-field zone and the intermediate-field zone is located at the intersection of the line from the $H_{i,j}$ to the source device and the perpendicular line passing through the $P_{i,j}^x$, and the vertical position $P_{i,j}^z$ of the recording point for each observation point in the far-field zone is $-H_{i,j}$, specifically:

$$P_{i,j}^z = \begin{cases} -\frac{H_{i,j}}{R_i} P_{i,j}^x = -\frac{H_{i,j}}{2}, & 0 \leq \frac{R_i}{H_j} \leq 1 \\ -\frac{H_{i,j}}{R_i} P_{i,j}^x = -\frac{R_i + 8H_{i,j}}{18}, & 1 < \frac{R_i}{H_{i,j}} < 10 \\ -H_{i,j}, & \frac{R_i}{H_{i,j}} \geq 10 \end{cases} \quad (2b)$$

wherein the positions of the recording point are the assignment point for the apparent resistivity $\rho_{i,j}^a$ of each observation point of the axial configuration on the xOz plane; and one survey line of the axial configuration generates one apparent resistivity-depth section profile along the survey line; and (2) using an equatorial configuration to collect data from equatorial observation points, wherein the equatorial configuration includes the survey line including a plurality of sensors that are arranged along an x'-axis of the rectangular coordinate system as the equatorial observation points, and a midpoint of the survey line is taken as an origin O' of a cylindrical-coordinate system, the source device emitting electromagnetic waves is positioned at the origin O of a cylindrical-coordinate system, a line from the source device to the observation point is along an r-axis, a part $$\frac{R_i}{H_{i,j}} \geq 10$$

in the Equation (2) for the recording point of the axial configuration is taken, and the offset $R_i$ is replaced with a position $x'_i$ of the observation point on the x'-axis, then on an x'O'z plane the horizontal position $P_{i,j}^{x'}$ and the vertical position $P_{i,j}^z$ of the recording point for each observation point are:

$$P_{i,j}^{x'} = x'_i, \text{ if } \frac{R_i}{H_{i,j}} \geq 10 \quad (3a)$$

$$P_{i,j}^z = -H_{i,j}, \text{ if } \frac{R_i}{H_{i,j}} \geq 10 \quad (3b)$$

a relationship between the offset $R_i$ and the position $x_i'$ of the observation point is expressed as:

$$R_i = \sqrt{OO'^2 + x_i'^2} \quad (4)$$

the positions of the recording point are the assignment point for the apparent resistivity $\rho_{i,j}^a$ of each observation point of the equatorial configuration on the x'O'z plane;

on an rOz plane the horizontal position $P_{i,j}^r$ and the vertical position $P_{i,j}^z$ of the recording point for each observation point of the equatorial configuration are:

$$P_{i,j}^r = \begin{cases} \frac{R_i}{2}, & 0 \leq \frac{R_i}{H_{i,j}} \leq 1 \\ \frac{R_i}{18}\left(\frac{R_i}{H_{i,j}} - 1\right) + \frac{R_i}{2}, & 1 < \frac{R_i}{H_{i,j}} < 10 \\ R_i, & \frac{R_i}{H_{i,j}} \geq 10 \end{cases} \quad (5a)$$

$$P_{i,j}^z = \begin{cases} -\frac{H_{i,j}}{R_i} P_{i,j}^r = -\frac{H_{i,j}}{2}, & 0 \leq \frac{R_i}{H_j} \leq 1 \\ -\frac{H_{i,j}}{R_i} P_{i,j}^r = -\frac{R_i + 8H_{i,j}}{18}, & 1 < \frac{R_i}{H_{i,j}} < 10 \\ -H_{i,j}, & \frac{R_i}{H_{i,j}} \geq 10 \end{cases} \quad (5b)$$

the positions of the recording point are the assignment point for the apparent resistivity $\rho_{i,j}^a$ of each observation point of the equatorial configuration on the rOz plane; and wherein, one survey line of the equatorial configuration comprising m observation points generates one apparent resistivity-depth section profile along the survey line and m apparent resistivity-depth sections profile along connecting lines from the observation points to the source device, wherein the generated apparent resistivity-depth section profiles prevent shadow effect caused by nonplanar-waves in short-offset electromagnetic exploration through an arrangement of the source device and the sensors in the axial configuration or the equatorial configuration.

2. The apparent resistivity-depth section generating method for the short-offset electromagnetic exploration according to claim 1, wherein the detection depth is calculated by the following general equations:

$$H_{i,j} = \sqrt{\frac{\rho_{i,j}^a}{\mu_0 \pi f_{i,j}}} = \sqrt{\frac{\rho_{i,j}^a}{4\pi \times 10^{-7} \pi f_{i,j}}} \approx 503 \sqrt{\frac{\rho_{i,j}^a}{f_{i,j}}} \quad (6a)$$

$$H_{i,j} = \sqrt{\frac{2 t_{i,j} \rho_{i,j}^a}{\mu_0}} = \sqrt{\frac{2 t_{i,j} \rho_{i,j}^a}{4\pi \times 10^{-7}}} \approx 1260 \sqrt{t_{i,j} \rho_{i,j}^a} \quad (6b)$$

wherein, Equation (6a) is a frequency-domain equation, $f_{i,j}$ is the jth frequency of the observation point i, $\rho_{i,j}^a$ is the apparent resistivity, $\mu_0$ is a vacuum permeability when the ground is a nonmagnetic medium, Equation (6b) is a time-domain equation, and $t_{i,j}$ is observation time for a jth time window of the measuring point i.

3. The apparent resistivity-depth section generating method for the short-offset electromagnetic exploration according to claim 2, wherein the apparent resistivity $\rho_{i,j}^a$ is calculated from a definition and an algorithm of a Cagniard apparent resistivity or a single-component apparent resistivity, or from any improved apparent resistivity definition and algorithm.

4. The apparent resistivity-depth section generating method for the short-offset electromagnetic exploration according to claim 1, wherein the apparent resistivity $\rho_{i,j}^a$ is calculated from a definition and an algorithm of a Cagniard apparent resistivity or a single-component apparent resistivity, or from any improved apparent resistivity definition and algorithm.

5. The apparent resistivity-depth section generating method for the short-offset electromagnetic exploration according to claim 1, wherein the method is applicable to any configuration with the offset, regardless of an electric source or a magnetic source.

6. The apparent resistivity-depth section generating method for the short-offset electromagnetic exploration according to claim 1, wherein field observation records further comprise the position of the source device besides the positions of the observation point, so as to determine the offset.

7. The apparent resistivity-depth section generating method for the short-offset electromagnetic exploration according to claim 1, wherein for frequency-domain or time-domain exploration, the field zone division standard is adjusted for any configuration, source device and observation component.

* * * * *